United States Patent
Cho et al.

(10) Patent No.: US 7,535,961 B2
(45) Date of Patent: May 19, 2009

(54) VIDEO ENCODING/DECODING APPARATUS AND METHOD FOR COLOR IMAGE

(75) Inventors: Dae-sung Cho, Seoul (KR); Hyun Mun Kim, Gyeonggi-do (KR); Woo-shik Kim, Gyeonggi-do (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 972 days.

(21) Appl. No.: 10/892,244

(22) Filed: Jul. 16, 2004

(65) Prior Publication Data

US 2005/0013363 A1    Jan. 20, 2005

(30) Foreign Application Priority Data

Jul. 16, 2003    (KR) .................. 10-2003-0048666

(51) Int. Cl.
  *H04N 7/12*    (2006.01)
(52) U.S. Cl. ....................... 375/240.12; 375/240.29
(58) Field of Classification Search ............... 348/627, 348/699, 630, 645, 631, 606, 610, 612, 621, 348/624, 625, 673, 683, 443, 433, 458, 414; 382/166, 254, 261, 266, 268, 275, 251, 248, 382/232, 233, 260, 262, 263, 264, 265, 267, 382/269; 375/240.24, 240.25, 240.03, 240.02, 375/240.01, 240.11, 240.12, 240.29, 240.27
See application file for complete search history.

(56) References Cited

U.S. PATENT DOCUMENTS

| 5,513,128 | A  | 4/1996 | Rao |
| 6,539,120 | B1 | 3/2003 | Sita et al. |
| 6,549,670 | B1 | 4/2003 | Sato et al. |

(Continued)

FOREIGN PATENT DOCUMENTS

EP    1296522 A    3/2003

(Continued)

OTHER PUBLICATIONS

"Text of Final Committee Draft of Joint Video Specification (ITU-T REC. H.264/ISO/IEC 14496-10 AVC)" International Organization for Standardization, Organization Internationale de Normalisation, XX, XX, Jul. 2002, pp. i-xv, 1-197.

(Continued)

*Primary Examiner*—Behrooz Senfi
(74) *Attorney, Agent, or Firm*—Staas & Halsey LLP

(57) ABSTRACT

A video encoding/decoding apparatus and method for color images include a first motion prediction unit that generates a first prediction residue image of an input image on a basis of a first motion prediction result of the input image. An image information detection unit sets a predetermined color component of an R-G-B image to a reference color component and determines whether the input image is a Y-Cb-Cr image or an R-G-B image and whether a color component is the reference color component. A second motion prediction unit performs motion prediction for the first prediction residue image and generates a second prediction residue image if the input image is the R-G-B image and the color component of the input image is not the reference color component.

9 Claims, 15 Drawing Sheets

U.S. PATENT DOCUMENTS

| | | | |
|---|---|---|---|
| 6,577,352 B1 * | 6/2003 | Park et al. | 348/624 |
| 6,611,620 B1 | 8/2003 | Kobayaskhi et al. | |
| 2001/0045993 A1 * | 11/2001 | Mise et al. | 348/663 |
| 2002/0141499 A1 * | 10/2002 | Goertzen | 375/240.12 |
| 2004/0247034 A1 * | 12/2004 | Zhong et al. | 375/240.29 |
| 2006/0126962 A1 * | 6/2006 | Sun | 382/268 |
| 2007/0037169 A1 * | 2/2007 | Cooper et al. | 435/6 |
| 2007/0200958 A1 * | 8/2007 | Lin et al. | 348/631 |

FOREIGN PATENT DOCUMENTS

| | | |
|---|---|---|
| JP | 2000-78411 A | 3/2000 |
| WO | 99/37097 A | 7/1999 |

OTHER PUBLICATIONS

Tamhankar A. et al.: "An overview of H.264/MPEG-4 Part 10" Proceedings of Multimedia Communications, IOS Press, Amsterdam, NL, vol. 1, Jul. 2, 2003, pp. 1-51.

Goffman-Vinopal L. et al.: "Color image compression using inter-color correlation" Proceedings 2002 International Conference on Image Processing. ICIP 2002. Rochester, NY, Sep. 22-25, 2002, International Conference on Image Processing, New York, NY: IEEE, US, vol. 2 of 3, Sep. 22, 2002, pp. 353-356.

Tudor P N: "MPEG-2 Video Compression Tutorial" IEE Colloquium on MPEG what it is and what it isn't, IEE, London, GB, 1995, pp. 2-1, XP000562433.

Fukuma S. et al.: "Inter color and inter/intra band prediction on reversible wave let for lossless progressive color coding", Image processing, 1999, ICIP 99, Proceedings. 1999 International Conference on Kobe, Japan Oct. 24-28, 1999, Piscataway, NJ, USA, IEEE, US, Oct. 24, 1999, pp. 53-57, XP010358685, ISBN: 0-7803-5467-2.

Kim W-S et al.: "Inter-plane Prediction for RGB Coding" Joint Video Team (JVT) of ISO/IEC MPEG & ITU-T VCEG (ISO/IEC JTC1/SC29/WG11 and ITU-T SG16 Q6), XX, XX, Jul. 22, 2003, pp. 1-10, XP002291150.

Obed Duardo: "Architecture and Implementation of ICS for a DSC-HDTV Video Decoder System", IEEE Micro, IEEE Inc. NY, US, vol. 12, No. 5, Oct. 1, 1992, pp. 22-27, XP000330853, ISSN: 0272-1732.

Kim C: "Adaptive post-filtering for reducing blocking and ringing artifacts in low bit-rate video coding" Signal Processing. Image Communication, Elsevier Science Publishers, Amsterdam, NL, vol. 17, No. 7, Aug. 2002, pp. 525-535, XP004372660, ISSN: 0923-5965.

Lee Y L. et al.: "Loop-filtering and post-filtering for low bit-rates moving picture coding" Image Processing, 1999, ICIP 99. Proceedings. 1999 International Conference on Kobe, Japan Oct. 24-28, 1999, Piscataway, NY, US, IEEE, US, vol. 1, Oct. 24, 1999, pp. 94-98, XP010369215, ISBN: 0-7803-5467-2.

European Search Report issued Mar. 17, 2005.

* cited by examiner

VIDEO ENCODING/DECODING APPARATUS AND METHOD FOR COLOR IMAGE

CROSS-REFERENCE TO RELATED APPLICATIONS

This application claims the priority of Korean Patent Application No. 2003-48666, filed on Jul. 16, 2003, in the Korean Intellectual Property Office, the disclosure of which is incorporated herein in its entirety by reference.

BACKGROUND OF THE INVENTION

1. Field of the Invention

The present invention relates to a video encoding/decoding apparatus for color images, and more particularly, to an apparatus and method for performing optimal encoding/decoding on a basis of color information and resolution information of color images.

2. Description of the Related Art

A conventional video compression method converts an image format such as an R-G-B image into an image format such as a Y-Cb-Cr image suitable to compression, to obtain a high compression rate. Also, the conventional video compression method reduces chroma (Cb, Cr) components to ¼ of their original sizes and encodes the Cb and Cr components to enhance compression efficiency. However, the conventional video compression method is not suitable for applications requiring high-quality image restoration because energy loss is generated due to subsampling of the Cb and Cr components and the quality loss of the corresponding image which is generated when R-G-B components are converted into Y-Cb-Cr components. To reduce these losses, it is necessary to encode the Cb and Cr components with the same resolution as the Y components.

Also, to obtain better quality when encoding the Y-Cb-Cr components, it is necessary to reduce the quality loss of the image by directly encoding the R-G-B components. However, the conventional video compression method encodes the R-G-B components using a conventional Y-Cb-Cr encoder without utilizing characteristics existing in the R-G-B color components different from those of Y-Cb-Cr components. A representative example of such a conventional video compression method is the AVC/H.264 standard developed by the Joint Video Team of the ISO/IEC MPEG and ITU-T VCEG.

However, since an R-G-B component and a Y-Cb-Cr component have different image characteristics, encoding efficiency is very low if the R-G-B component is encoded by the conventional Y-Cb-Cr encoder. For example, the respective components (Y, Cb, and Cr) of a Y-Cb-Cr image have no correlation within a same area, while the respective components (R, G, and B) of an R-G-B image have correlation within the same area.

Also, the R, G and B components of the R-G-B image have a similar frequency characteristic, however, in the Y-Cb-Cr image, the Y component has a Luma component that is different from a frequency characteristic of Cb and Cr components having Chroma components due to a process performed when the R-G-B image is converted into the Y-Cb-Cr image. As such, the conventional video compression method has not correctly reflected characteristics of the R-G-B image and the Y-Cb-Cr image with respect to encoding. Also, the conventional video compression method has not reflected the change of the frequency characteristic according to the size of an image when encoding.

SUMMARY OF THE INVENTION

The present invention provides a video encoding/decoding apparatus and method to enhance the encoding/decoding efficiency of an R-G-B image using inter-plane prediction.

The present invention also provides a motion compensation apparatus and method to perform effective motion compensation according to color information and resolution information upon video encoding/decoding.

The present invention also provides a deblocking filter to reduce block efficiency effectively according to color information and resolution information upon video encoding/decoding, and a deblocking filtering method therefor.

According to an aspect of the present invention, a video encoding apparatus comprises: a first motion prediction unit generating a first prediction residue image for an input image on a basis of a first motion prediction result of the input image; an image information detection unit setting a reference color component among color components of an R-G-B image, determining whether the input image is a Y-Cb-Cr image or the R-G-B image, and determining whether a color component of the input image is the reference color component; and a second motion prediction unit performing motion prediction of the first prediction residue image and generating a second prediction residue image on a basis of the reference color component if the input image is the R-G-B image and the color component of the input image is not the reference color component.

According to another aspect of the present invention, a video encoding method, which is performed by an encoder, comprises: generating a first prediction residue image for an input image on a basis of a first motion prediction result of the input image; setting a reference color component among color components of an R-G-B image, determining whether the input image is a Y-Cb-Cr image or the R-G-B image, and determining whether a color component of the input image is the reference color component; and, if the color component of the input image is the reference color component, performing motion prediction for the first prediction residue image and generating a second prediction residue image on a basis of the reference color component if the input image is the R-G-B image and the color component of the input image is not the reference color component.

According to another aspect of the present invention, a video decoding apparatus comprises: a first restoration unit performing a predetermined operation for an encoded image and generating a first prediction residue image of the encoded image; an image information detection unit determining whether the encoded image is an R-G-B image or a Y-Cb-Cr image and whether a color component of the encoded image is a reference color component of the R-G-B image; a second restoration unit generating a second prediction residue image of the encoded image on a basis of the reference color component if the encoded image is the R-G-B image and the color component of the encoded image is not the reference color component; a deblocking filter unit reducing a block effect of a decoded image of an encoded image restored on a basis of the first prediction residue image and the second prediction residue image.

According to another aspect of the present invention, a video decoding method comprises: performing a predetermined operation of an encoded image and generating a first prediction residue image of the encoded image; determining whether the encoded image is an R-G-B image or a Y-Cb-Cr image and whether a color component of the encoded image is a reference color component of the R-G-B image; generating a second prediction residue image of the encoded image on a basis of the reference color component if the encoded image is the R-G-B image and the color component of the encoded image is not the reference color component; and reducing a block effect of a decoded image of an encoded image restored on a basis of the first prediction residue image and the second prediction residue image.

According to another aspect of the present invention, a motion compensation apparatus, which is included in a decoder or encoder, comprises: an image information detector detecting color information of an input image; a filter tap selector selecting a length of a filter tap for compensation on a basis of the color information of the input image; an interpolator interpolating the input image using a filter tap with the selected length; and a motion compensator performing motion compensation for the interpolated result.

According to another aspect of the present invention, a motion compensation method, which is performed by an encoder or decoder, comprises: detecting color information of an input image; selecting a length of a filter tap for interpolation on a basis of the color information of the input image; interpolating the input image using a filter tap with the selected length; and performing motion compensation for the interpolated result.

According to another aspect of the present invention, a motion compensation apparatus, which is included in a decoder or encoder, comprises: an image information detector detecting resolution and color information of an input image; a filter tap selector selecting a length of a filter tap for interpolation on a basis of the resolution information and the color information of the input image; an interpolator interpolating the input image using a filter tap with the selected length; and a motion compensator performing motion compensation for the interpolated result.

According to another aspect of the present invention, a motion compensation method, which is performed by a decoder or encoder, comprises: detecting resolution information and color information of an input image; selecting a length of a filter tap for interpolation on a basis of the resolution information and color information of the input image; interpolating the input image using a filter tap with the selected length; and performing motion compensation for the interpolated result.

According to another aspect of the present invention, a deblocking filter apparatus, which is included in a video decoder or video encoder, comprises: an image information detector detecting color information of an image; a deblocking filter selector selecting a length of a deblocking filter tap for reducing block effect of the image on a basis of the color information; a filtering unit filtering the image using a deblocking filter with the selected tap length.

According to another aspect of the present invention, a deblocking filter selection method, which is performed by a decoder or encoder, comprises: detecting color information of an image; selecting a length of a deblocking filer for reducing block effect of the image on a basis of the color information; and filtering the image using a deblocking filter with the selected length.

Additional aspects and/or advantages of the invention will be set forth in part in the description which follows and, in part, will be obvious from the description, or may be learned by practice of the invention.

BRIEF DESCRIPTION OF THE DRAWINGS

These and/or other aspects and advantages of the invention will become apparent and more readily appreciated from the following description of the embodiments, taken in conjunction with the accompanying drawings of which:

FIGS. 12A and 12B show vertical and horizontal boundaries of macro blocks to be input to the deblocking filter;

FIGS. 13A and 13B show image samples of vertical and horizontal boundaries of a 4×4 block;

DETAILED DESCRIPTION OF THE PREFERRED EMBODIMENTS

Figure 1A:
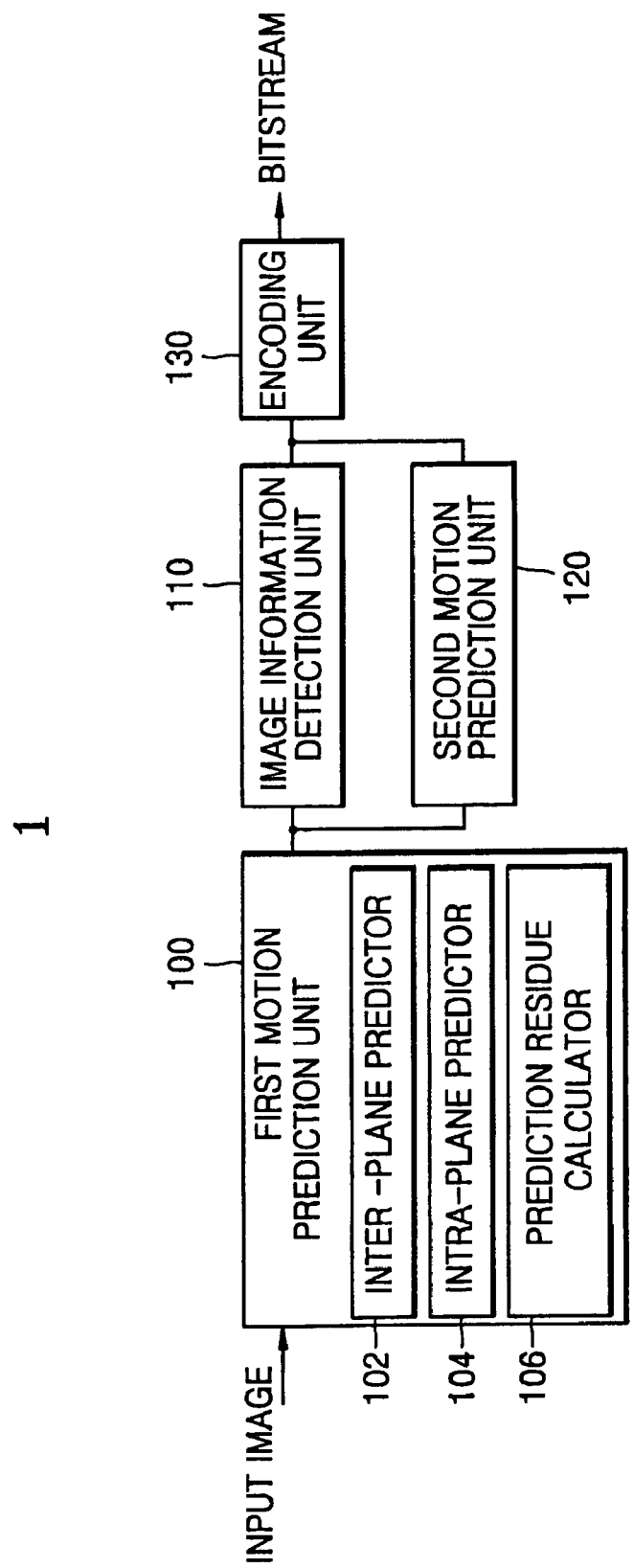
FIGS. 1A and 1B are block diagrams showing structures of video encoding apparatuses according to embodiments of the present invention.

Reference will now be made in detail to the embodiments of the present invention, examples of which are illustrated in the accompanying drawings, wherein like reference numerals refer to the like elements throughout. The embodiments are described below to explain the present invention by referring to the figures.

FIG. 1A is a block diagram showing a structure of a video encoding apparatus according to an embodiment of the present invention. Referring to FIG. 1A, the video encoding apparatus includes a first motion prediction unit 100, an image information detection unit 110, a second motion prediction unit 120, and an encoding unit 130. The first motion prediction unit 100 includes an inter-plane predictor 102, an intra-plane predictor 104, and a prediction residue calculator 106.

The inter-plane predictor 102 and intra-plane predictor 104 of the first motion prediction unit 100 perform motion prediction of an input image on a basis of temporally and spatially adjacent images of the input image. The inter-plane predictor 102 performs motion prediction of the input image using a previously-restored image temporally adjacent to the input image. The intra-plane predictor 104 performs motion prediction of the input image using encoding unit blocks of an input image spatially adjacent to the input image. Generally, since an initial input image has no previously-restored image, the intra-plane predictor 104 performs motion prediction for the initial input image and the inter-plane predictor 102 performs motion prediction for the following input images. The prediction residue calculator 106 generates a first prediction residue image using a difference between the input image and a motion prediction result of the inter-plane predictor 102 or the intra-plane predictor 104.

Also, the first motion prediction unit 100 selectively uses filter taps with different tap lengths according to color information and resolution information of the input image. This will be described in detail later with reference to FIGS. 4 through 9.

The image information detection unit 110 determines whether the input image is a Y-Cb-Cr image or an R-G-B image. Also, the image information detection unit 110 perceives a color component of the input image. That is, the image information detection unit 110 determines whether the color component of the input image is an R, G, or B component of an R-G-B image, or a Y (Luma), Cb, or Cr (Chroma) component of a Y-Cb-Cr image. Also, the image information detection unit 110 sets a specific color component among color components of the R-G-B image to a reference color component. That is, one among the R, G and B components may be set to the reference color component. Hereinafter, as an example, it is assumed that the G component is set to the reference color component.

The second motion prediction unit 120 performs motion prediction for the first prediction residue image output from the first motion prediction unit 100 on a basis of the reference color component and generates a second prediction residue image if an input image is the R-G-B image and a color component of the input image is not the reference color component of the R-G-B image. The reference color component used by the second prediction unit 120 is received, encoded and decoded before a current input image is received. In detail, the second motion prediction unit 120 performs motion prediction on a basis of a prediction residue image of the reference color component encoded and decoded.

For example, if the reference color component is a G component and a color component of an input image is a B component, the first motion prediction unit 100 generates a first prediction residue for the B and G components on a basis of a motion prediction result of the input image. Also, the image information detection unit 110 determines whether the input image is an R-G-B image and whether the color component of the input image is a different color component (for example, a B component) from the reference color component (a G component). The second motion prediction unit 120 performs inter-plane prediction for the first prediction residue image of the input image (a B component) on a basis of a first encoded prediction residue image of the reference color component (a G component) encoded and then decoded, and generates a second prediction residue image. That is, the input image with the B component is subjected to prediction twice by the first motion prediction unit 100 and the second motion prediction unit 120.

The encoding unit 130 encodes the first prediction residue image generated by the first motion prediction unit 100 and the second prediction residue image generated by the second motion prediction unit 120, and generates a bitstream. In detail, the encoder 130 performs a Discrete Cosine Transform (DCT) or a Discrete Integer Transform 132 of the prediction residue images, performs quantization and entropy-encoding of the transformed values, and generates an encoded image (bitstream).

Since a Y-Cb-Cr image is converted from an R-G-b image using a color coordinate transform method, the Y-Cb-Cr image and the R-G-B image have different characteristics in terms of encoding. That is, the respective Y, Cb, and Cr components of the Y-Cb-Cr image are not correlated with each other at the same spatial location, while the respective components of the R-G-B image are correlated with each other. Accordingly, the video encoding apparatus, according to an embodiment of the present invention, uses a different prediction method when encoding in accordance with whether an input image is an R-G-B image or a Y-Cb-Cr image.

As a result, the video encoding apparatus, according to an embodiment of the present invention, sets one of the color components of an R-G-B image to a reference color component and encodes the reference color component using the conventional encoding method. Also, the video encoding apparatus predicts the remaining two color components, except for the reference color component of the R-G-B image, using spatially adjacent pixels or temporally adjacent pixels, and then performs prediction of the predicted result once more on a basis of the reference color component.

Figure 1B:
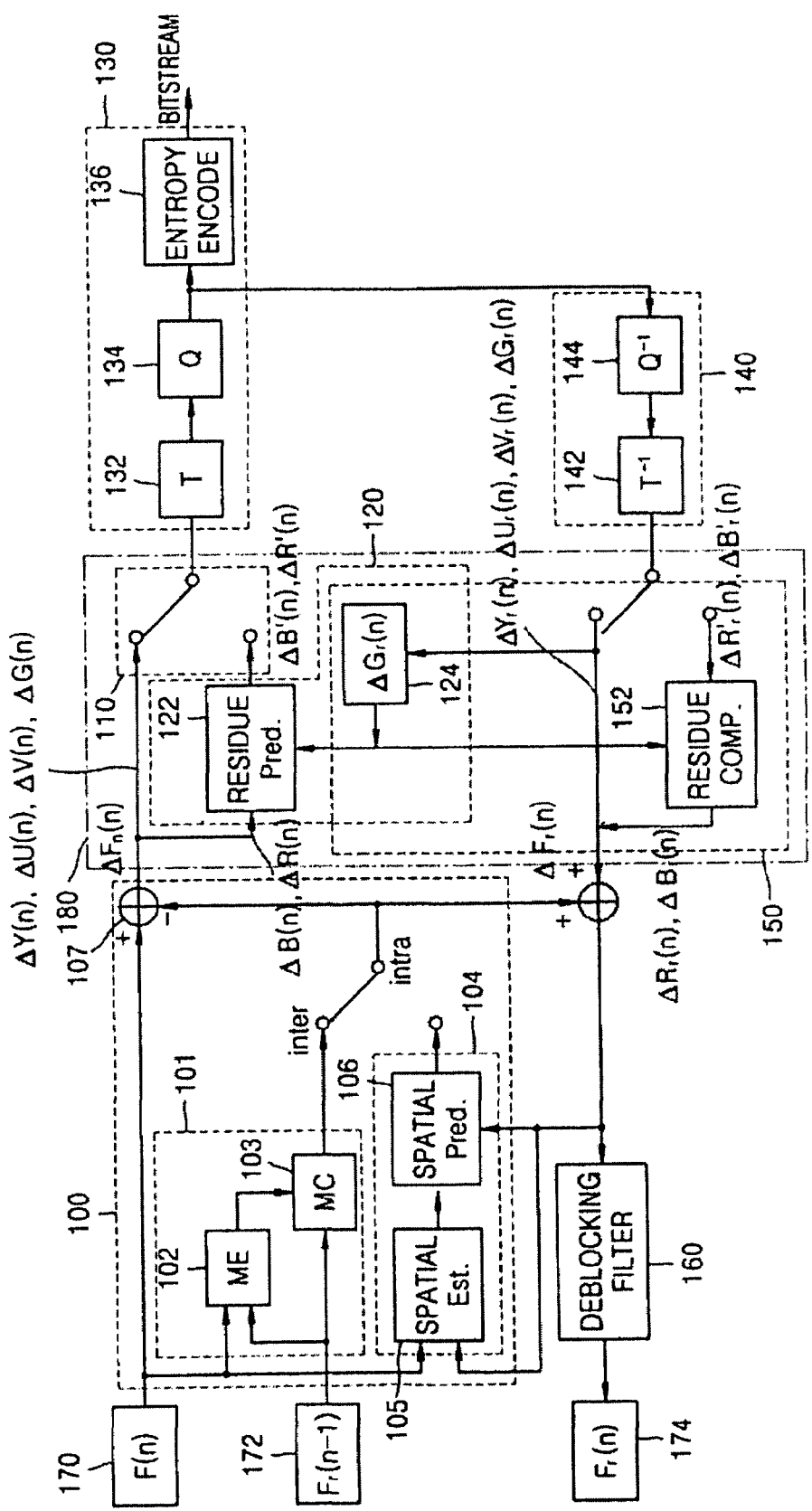

FIG. 1B is a block diagram showing a structure of a video encoding apparatus according to another embodiment of the present invention. Referring to FIG. 1B, the video encoding apparatus, according to an embodiment of the present invention, includes a first motion prediction unit 100, an image information detection unit 110, a second motion prediction unit 120, an encoding unit 130, a first restoration unit 140, a second restoration unit 150, and a deblocking filter unit 160. The first motion prediction unit 100 includes an inter-plane predictor 101, an intra-plane predictor 104, and a prediction residue calculator 107.

An input image (F(n)) 170 is a Y-Cb-Cr image or an R-G-B image. Each block of the input image 170 is processed by the video encoding apparatus according to an embodiment of the present invention. The first motion prediction unit 100 includes an inter-plane predictor 101 which has a motion estimator (ME) 102 and a motion compensator (MC) 103 to estimate and predict motion on a basis of a previously-restored image (Fr(n−1)) 172 to enhance encoding efficiency, and an intra-plane predictor 104 which has a spatial estimator (SE) 105 and a spatial predictor (SP) 106 to estimate and predict motion on a basis of spatially adjacent blocks.

An interpolation method of motion compensation is changed according to the respective color components of Y-Cb-Cr (or Y-U-V) images and R-G-B images. First, the prediction residue calculator 107 obtains an encoded prediction residue image ΔF(n) on a basis of the input image 170 and the motion prediction results obtained by the inter-plane predictor 101 or the intra-plane predictor 104. If the input image 170 is a Y-Cb-Cr image, the prediction residue calculator 107 obtains prediction residues ΔY(n), ΔU(n) and ΔV(n) using the prediction residue image ΔF(n). If the input image 170 is an R-G-B image, the prediction residue calculator 107 obtains prediction residues ΔR(n), ΔG(n) and ΔB(n) using the prediction residue image ΔF(n).

The encoding unit 130 performs a DCT (or a Discrete Integer Transform), quantization and entropy encoding of the prediction residues ΔY(n), ΔU(n) and ΔV(n) of the Y-Cb-Cr image or the prediction residue ΔG(n) of the R-G-B image, thus compressing the prediction residues.

If the input image 170 is an R-G-B image, a prediction residue predictor (RP) 122 of the second motion prediction unit 120 performs inter-plane prediction of the prediction residues ΔB(n) and ΔR(n) of R and B components, using a prediction residue ΔGr(n) 124 of a restored G component.

Also, the encoding unit 130 performs a DCT (or a Discrete Integer Transform), quantization, and entropy encoding of prediction residue images ΔB' and ΔR'(n) obtained through the inter-plane prediction, thus compressing the prediction residue images. The DCT is defined by the ISO/IEC MPEG-4 part 2 standard and the Discrete Integer Transform is defined by the AVC/H. 264 standard developed by the Joint Video Team of the ISO/IEC MPEG and ITU-T VCEG.

The first restoration unit 140 performs dequantization of the image (to be restored) transformed and quantized by the encoding unit 130 so that the image may be used for prediction using spatially adjacent blocks or temporally following images, and then performs an Inverse Discrete Cosine Transform (IDCT) of the image, thus generating prediction residue images for the respective color components of the image.

The first restoration unit 140 obtains restored prediction residue images ΔYr(n), ΔUr(n) and ΔVr(n) if the image to be restored is a Y-Cb-Cr image. Also, the first restoration unit 140 obtains restored prediction residue images ΔGr(n), ΔB'r(n) and ΔR'r(n) if the image to be restored is an R-G-B image. The prediction residue image ΔGr(n) is stored in a buffer 124 and undergoes inter-plane prediction by the second motion prediction unit 120.

If color components of the image to be restored are R and B components, the second restoration unit 150 obtains restored prediction residue images ΔBr(n) and ΔRr(n) of the R and B components using the restored prediction residue image ΔGr(n) of the G component. The restored prediction residue images ΔYr(n) ΔUr(n) and ΔVr(n) of the Y-Cb-Cr image or the restored prediction residue images ΔGr(n) and ΔBr(n) of the R-G-B image are input as an input Fr(n) to the deblocking filter 160.

The deblocking filter (loop filter) unit 160 adds the input Fr(n) to the inter-plane or intra-plane prediction results generated by the first motion prediction unit 100, and filters the added result, thus reducing a block effect. The deblocking filter unit 160 according to an embodiment of the present invention uses different filter tap lengths at block boundary areas according to the respective components of the Y-Cb-Cr (or Y-U-V) image and the R-G-B image. This will be described in detail with reference to FIGS. 10 and 11.

Figure 2:
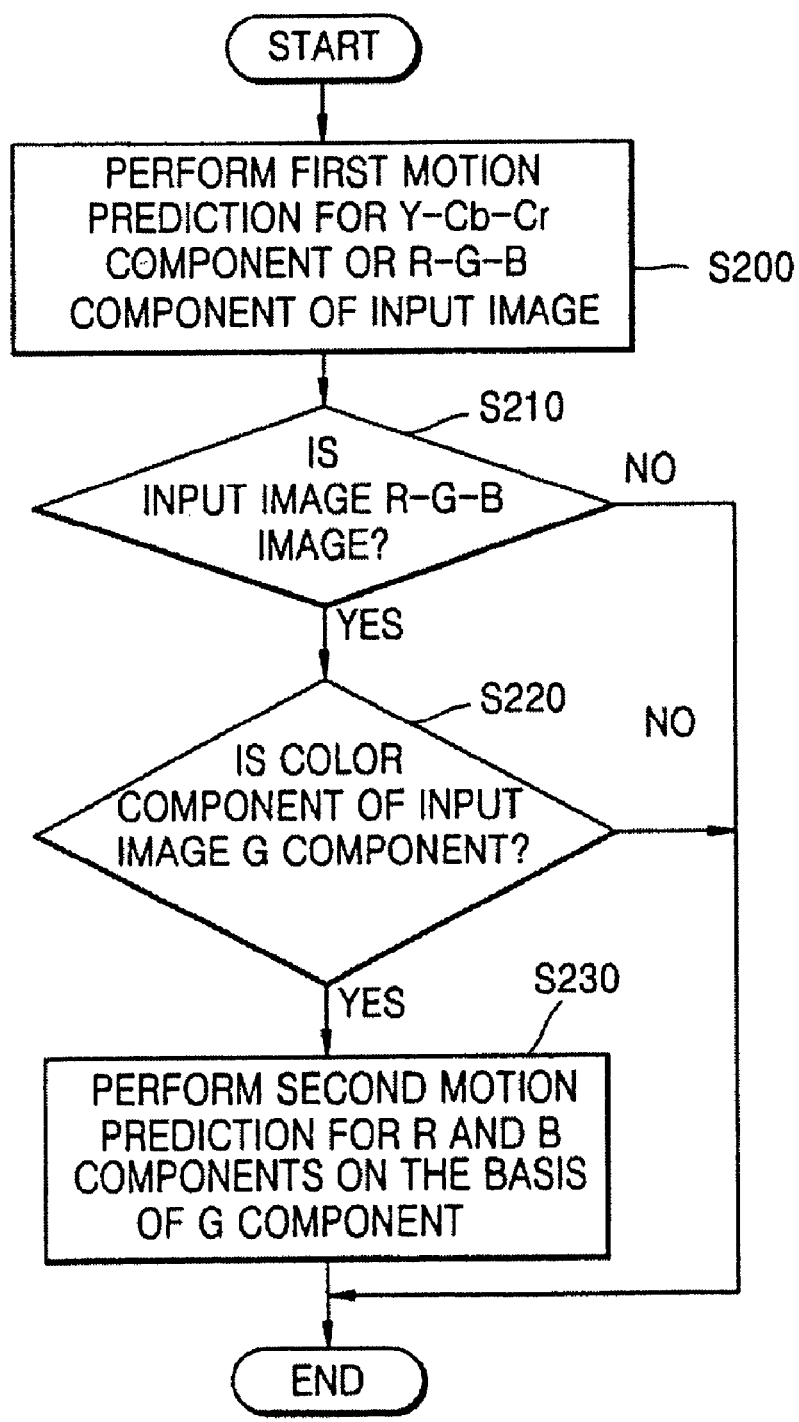
FIG. 2 is a flowchart illustrating a video encoding method according to an embodiment of the present invention.

FIG. 2 is a flowchart illustrating a video encoding method according to an embodiment of the present invention. Referring to FIGS. 1A and 2, the first motion prediction unit 100 performs temporal/spatial prediction (inter-plane prediction/intra-plane prediction) for an input image, in operation S200. The image information detection unit 110 sets a G component as a reference color component of an R-G-B image and determines whether the input image is an R-G-B image, in operation S210. If the input image is an R-G-B image, the image information detection unit 110 determines whether the color component of the input image is the G component which is being utilized as the reference color component, in operation S220. If the color component of the input image is an R or B component, the second motion prediction unit 120 performs inter-plane prediction on the respective components using a prediction residue image of a restored G component in operation S306. In other words, the video encoding method, according to an embodiment of the present invention, performs motion prediction for different color components, except for the reference color component, using the first motion prediction unit 100, and then performs motion prediction for the different color components on a basis of the reference color component. The prediction residue images obtained by the first motion prediction unit 100 or the second motion prediction unit 110 are compressed by a DCT (or Discrete Integer Transform), quantization, and entropy encoding.

Hereinafter, the intra-plane prediction applied to the R and B components except for the reference color component of the R-G-B image will be described in more detail. First, motion prediction is performed on an input image with a G component using the input image, and a prediction residue image ΔG of the G component is obtained from the difference between the result of the motion prediction and the input image. This prediction residue image ΔG may be expressed by equation 1:

$$\Delta G = G - Gp \qquad (1).$$

Here, Gp is a value predicted using a G component image spatially adjacent to the G component or a G component image temporally adjacent to the G component. The prediction residue image is subjected to entropy encoding.

There is still a significant correlation between the G, R, and B components, compared to the Y, Cr, and Cb components. To use similarity between the G component and the R and B components, the R and B components are temporally and spatially predicted in accordance with the temporal and spatial prediction of the G component. Accordingly, prediction residue images ΔR and ΔG are obtained as follows:

$$\Delta R = R - Rp \qquad (2)$$

$$\Delta B = B - Bp \qquad (3).$$

Here, Rp and Bp are prediction residue values of the R and B components predicted using their spatially or temporally adjacent images. The prediction residue values are subtracted by a linearly-transformed value of an encoded and decoded prediction residue image of the G component, so that inter-plane predicted residue images ΔR' and ΔG' of the R and B components are obtained as in the following equations 4 and 5:

$$\Delta R' = \Delta R - f(\Delta Gr) = \Delta R - (a \cdot \Delta Gr + b) \qquad (4)$$

$$\Delta B' = \Delta B - f(\Delta Gr) = \Delta B - (c \cdot \Delta Gr + d) \qquad (5).$$

These data values are smaller, and thus require less encoding compared to the temporal/spatial prediction residues ΔR and ΔB of the R and B components, so that encoding efficiency may be enhanced because the prediction residue images ΔR and ΔB may be approximated to a function of ΔG by expressing a relationship between the prediction residues ΔG and ΔR and a relationship between the prediction residues ΔG and ΔB by a linear function using a fact that there is a significant correlation between the prediction residue images ΔG, ΔR, and ΔB. Hereinafter, values a and b (equations 6 and 7) are a gradation and a deviation of the approximated linear function when the prediction residue of the R component is predicted using the prediction residue of the G component, and values c and d (equations 8 and 9) are a gradient and a deviation of the approximated linear function when the prediction residue of the B component is predicted using the prediction residue of the G component.

$$a = \frac{cov(\Delta G, \Delta R)}{\sigma^2_{\Delta G}} \qquad (6)$$

$$b = E(\Delta R) - a \cdot E(\Delta G) \qquad (7)$$

$$c = \frac{cov(\Delta G, \Delta B)}{\sigma^2_{\Delta G}} \qquad (8)$$

$$d = E(\Delta B) - c \cdot E(\Delta G) \qquad (9)$$

Here, $cov(\cdot)$ is a covariance, $E(\cdot)$ is an average of the values, and $\sigma^2$ is a variance.

Figure 3A:
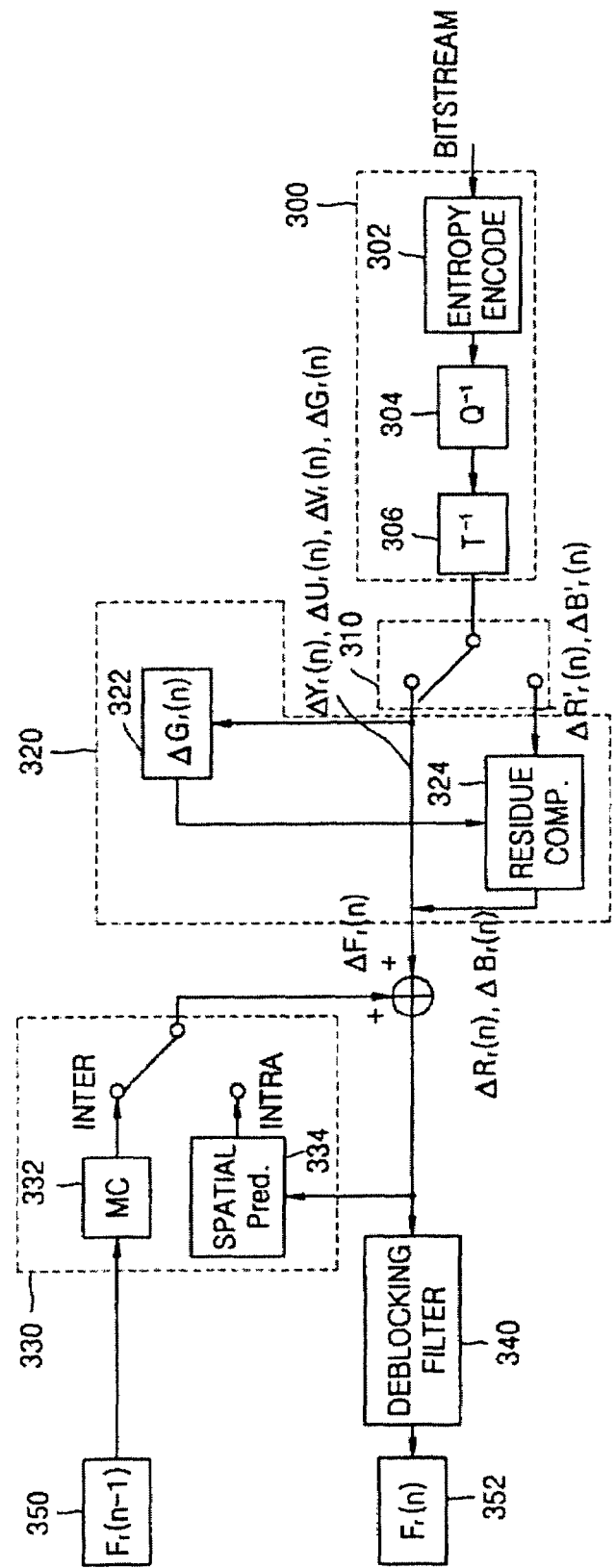
FIG. 3A is a block diagram showing a structure of a video decoding apparatus according to an embodiment of the present invention.

FIG. 3A is a block diagram showing a structure of a video decoding apparatus according to an embodiment of the present invention. Referring to FIG. 3A, the video decoding apparatus includes a first restoration unit 300, an image information detector 310, a second restoration unit 320, a motion prediction unit 330, and a deblocking filter 340.

The video decoding apparatus, according to an embodiment of the present invention, restores an image from a compressed bitstream (that is, an encoded image). The first restoration unit 300 performs entropy decoding 302, dequantization 304, and an inverse discrete integer transform 306 of the compressed bitstream (data), and obtains restored prediction residue images $\Delta Yr(n)$, $\Delta Ur(n)$ and $\Delta Vr(n)$ of the respective components of a Y-Cb-Cr image if the compressed bitstream is the Y-Cb-Cr image. Meanwhile, the first restoration unit 300 obtains restored prediction residue images $\Delta Gr(n)$, $\Delta B'r(n)$ and $\Delta R'r(n)$ if the compressed bitstream is an R-G-B image.

The image information detector 310 determines whether the compressed bitstream is a Y-Cb-Cr image or an R-G-B image, and whether a color component of the compressed bitstream is a reference color component of an R-G-B image. Hereinafter, in the following example, it is assumed that a G component is set to the reference color component.

If the compressed bitstream is a Y-Cb-Cr image or a reference color component of an R-G-B image, a prediction residue image restored by the first restoration unit 300 is a prediction residue image $\Delta Fr(n)$ 352 to be input to the motion prediction unit 330.

The second restoration unit 320 stores a prediction residue image $\Delta Gr(n)$ of the G component for inter-plane prediction to restore prediction residue images of R and B components if the compressed bitstream is a B or R component (that is, a different component other from the reference color component) of the R-G-B image.

Meanwhile, if a bitsteam is encoded by the inter-plane prediction of the video encoder FIGS. 1A and 1B), the second restoration unit 320 adds an inter-plane predicted value of a previous image Fr(n−1) obtained by a MC (motion comparator) 332 of the motion prediction unit 330 with a prediction residue image obtained by the first restoration unit 300 and the second restoration unit 320, and obtains restored values of the respective components of the R-G-B or Y-Cb-Cr image. If the bitstream is encoded by the intra-plane prediction, the second restoration unit 320 adds intra-plane prediction values obtained by a SP (spatial predictor) 334 of the motion predictor 330 with a prediction residue image obtained by the first restoration unit 330 and the second restoration unit 320, and obtains restored values of the respective components of the R-G-B or Y-Cb-Cr image. Here, the inter-plane prediction of the motion prediction unit 330 is performed using different interpolation methods upon motion compensation, according to the respective components of the Y-Cb-Cr (or, Y-U-V) image and the R-G-B image. This will be described in more detail with reference to FIGS. 4 through 9. The values restored by the second restoration unit 320 are passed through the deblocking filter 340 for reducing a block effect and are output as restored images Fr(n) 352 of the respective color components.

The deblocking filter unit 340 selectively uses deblocking filter with different filter tap lengths, which are used at block boundaries, according to the respective components of the Y-Cb-Cr (or, Y-U-V) image and the R-G-B image. This will be described with reference to FIGS. 10 and 11.

Figure 3B:
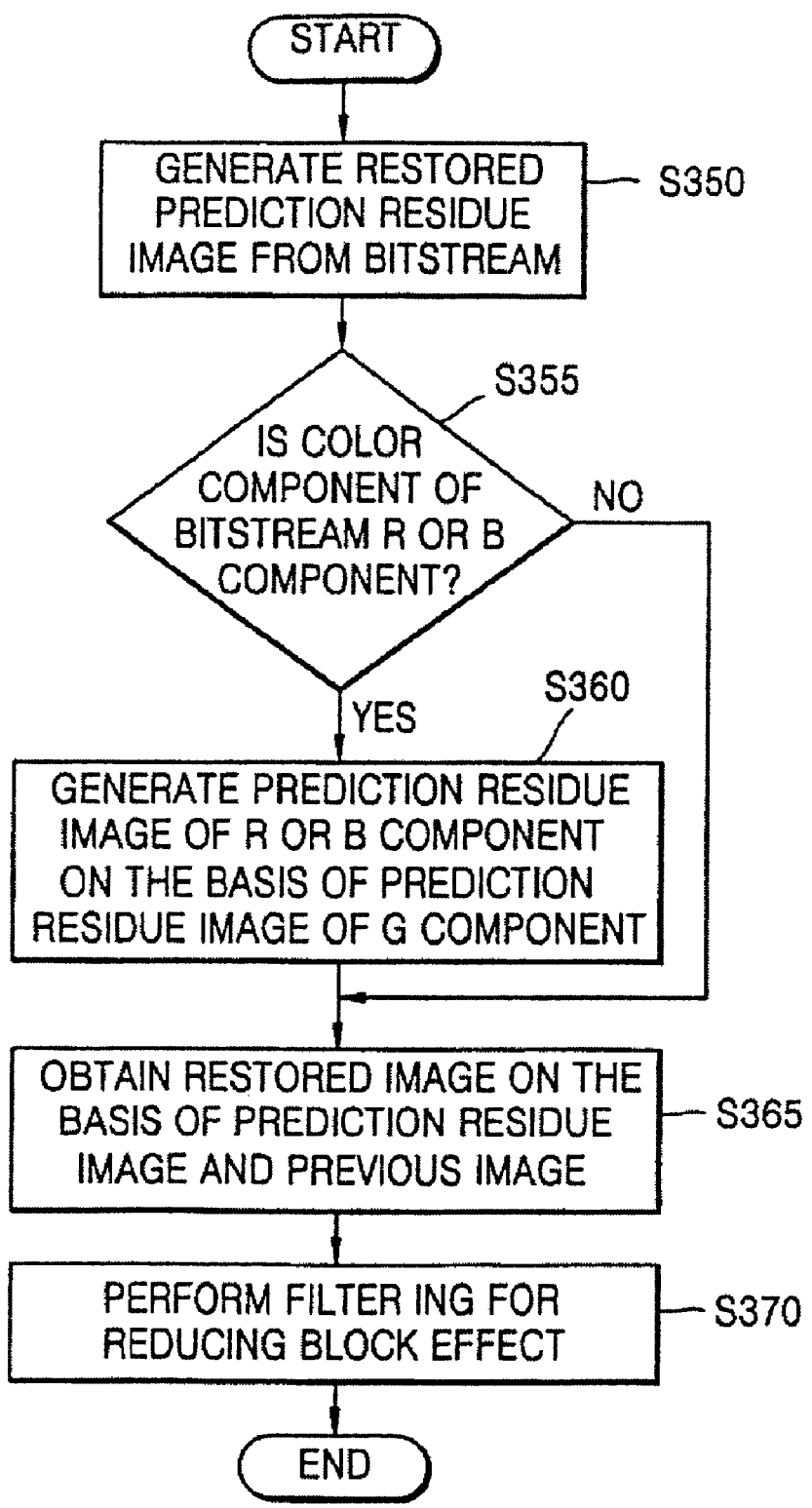
FIG. 3B is a flowchart illustrating a video decoding method according to an embodiment of the present invention.

FIG. 3B is a flowchart illustrating a video decoding method according to an embodiment of the present invention. Referring to FIGS. 3A and 3B, the first restoration unit 300 generates a first prediction residue image from the bitstream in operation S350. Also, the image information detector 310 determines whether the bitstream is a Y-Cb-Cr image or an R-G-B image and whether a color component of the bitstream is a reference color component of the R-G-B image, in operation S355.

If the bitstream is an R-G-B image and the color component of the bitstream is not a reference color component of the R-G-B image, the second restoration unit 320 predicts the first prediction residue image obtained by the first restoration unit 300 using the first prediction residue image of the reference color component, and generates a second prediction residue image, in operation S360.

The second restoration unit 320 adds the first and second prediction residue images with the motion prediction result of the previous image obtained by the motion predictor 330, and obtains a restored image, in operation S365. The deblocking filter unit 340 reduces a block effect of the restored image and obtains a final restored image Fr(n) 352 in operation S370.

Figure 4:
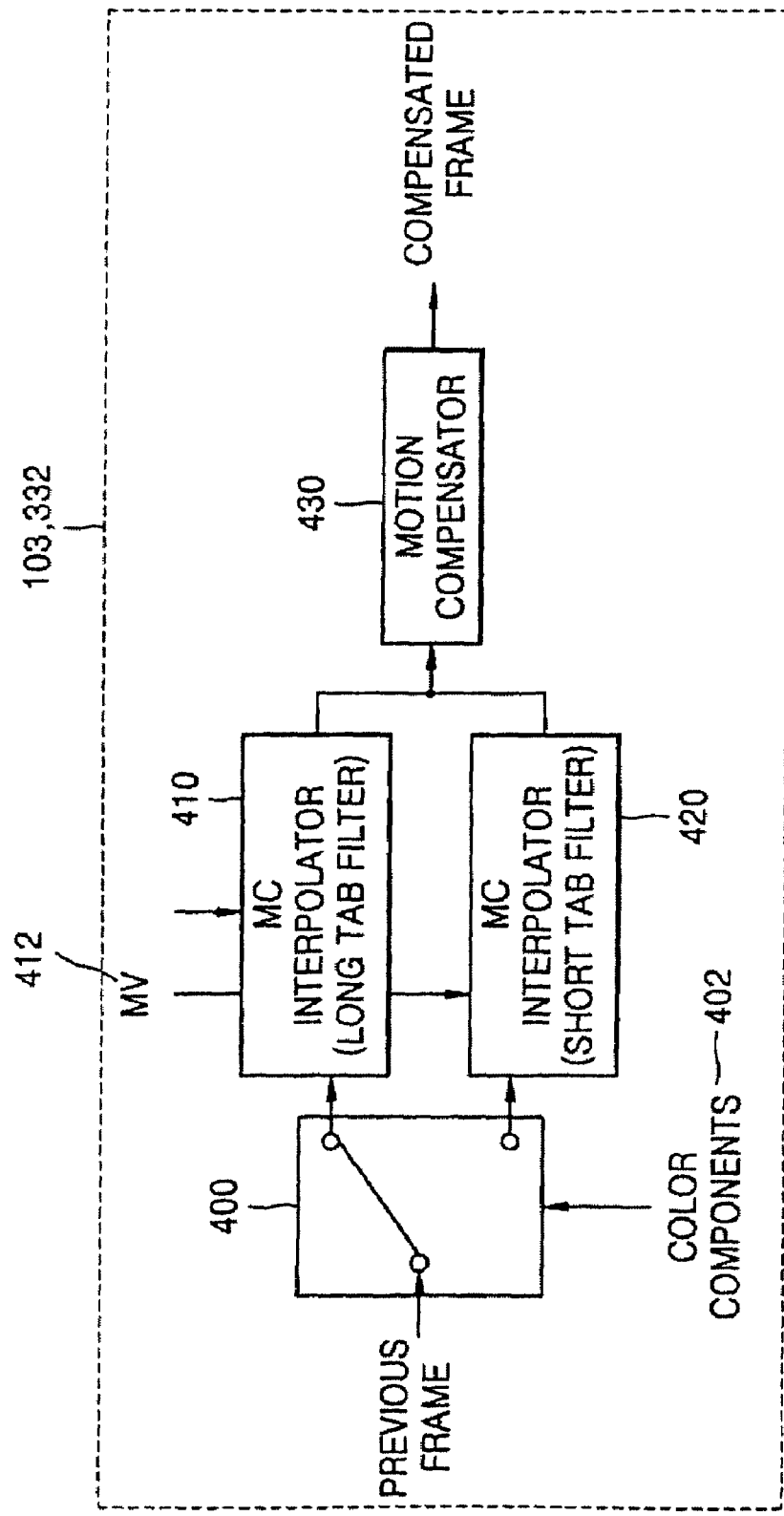
FIG. 4 is a block diagram of a motion compensation apparatus that compensates for motion on a basis of color information of an image according to an embodiment of the present invention.

FIG. 4 is a block diagram showing a structure of a motion compensation apparatus according to an embodiment of the present invention. Referring to FIG. 4, the motion compensation apparatus 103 or 332 includes an image information detector (not shown), a filter tap selector 400, interpolators 410 and 420, and a motion compensator 430.

R, G, and B components of an R-G-B image have a similar frequency characteristic, but in a Y-Cb-Cr image, a Y component which is a luma component is different from a frequency characteristic of Cb and Cr components which are chroma components. Also, the chroma components of the Y-Cb-Cr image have a plurality of low frequency components and significant correlation therebetween, compared to the luma component. FIG. 4 is a block diagram of a motion compensation apparatus using a different prediction method according to color components of an image.

The image information detector (not shown) determines whether an input image is a Y-Cb-Cr image or an R-G-B image and whether a color component of the input image is a reference color component of an R-G-B image. Generally, the reference color component of the R-G-B image is set to a G component.

The filter tap selector 400 selects a long tap filter interpolator 410 or a short tap filter interpolator 420 according to color component information 402 of an input image received from the image information detector (not shown). That is, the filter tap selector 400 selects a filter tap for optimal motion prediction according to the respective color components of the input image. In this disclosure, a long tap filter may be a 6 tap filter and a short tap filter may be a 2 tap filter.

For example, the filter tap selector 400 selects a 6 tap filter interpolator if the input image is the Y-Cb-Cr image or if the color component of the input image is not the reference color component of the R-G-B image, and selects a 2 tap filter interpolator if the color component of the input image is the reference color component of the R-G-B image.

The interpolator 410 or 420 selected by the filter tap selector 400 interpolates the input image to perform motion compensation of the input image. At this time, each of the interpolators 410 and 420 interpolates the input image on a basis of a motion vector 412 of a previous frame.

Alternatively, the interpolators 410 and 420 may be a 6 tap filter interpolator 410 and a bilinear interpolator 420, respectively. If the filter tap selector 400 selects the 6 tap filter interpolator 410, the 6 tap filter interpolator 410 interpolates the input image. The input image interpolated by the interpolator 410 or 420 undergoes motion compensation by the motion compensator 430.

Figure 5:
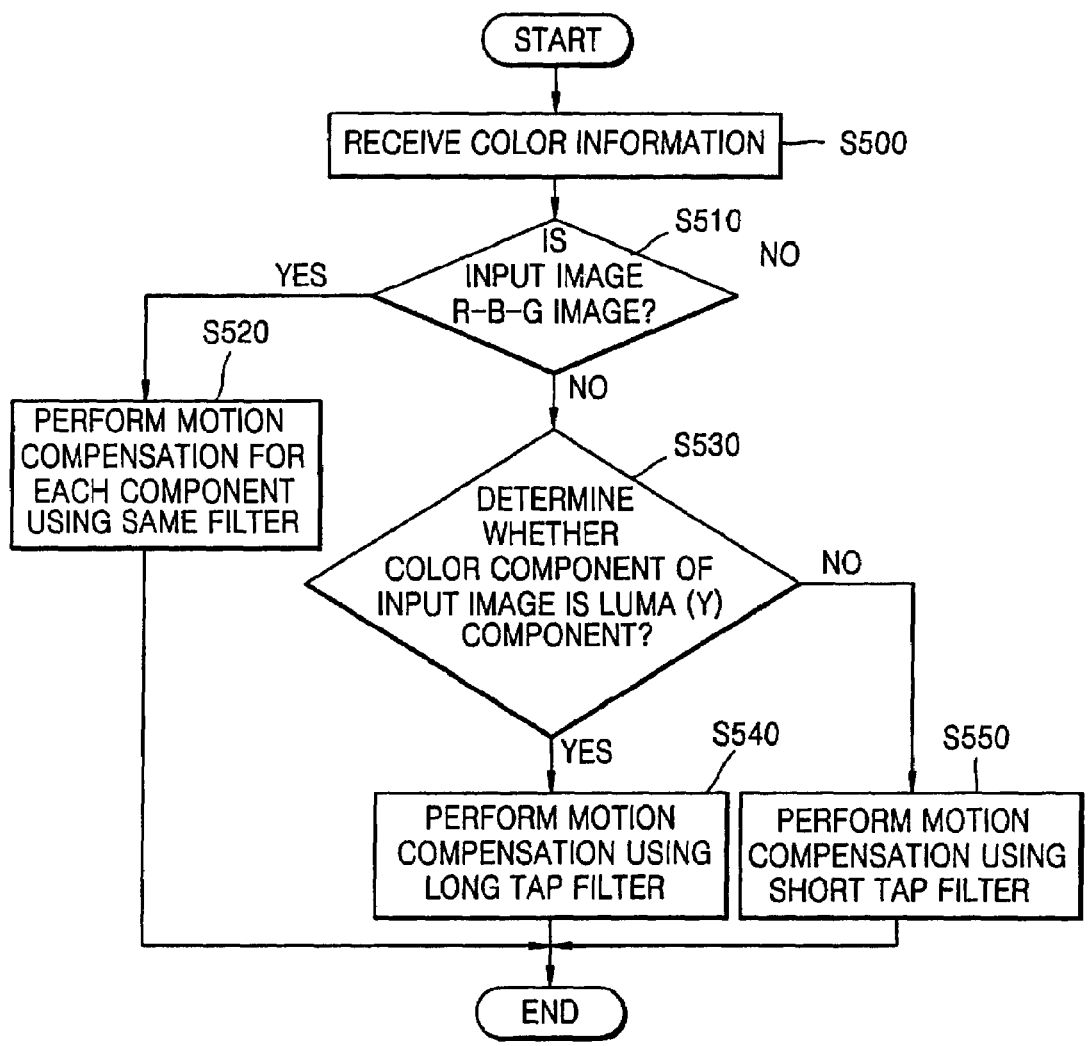
FIG. 5 is a flowchart illustrating a method of performing motion compensation according to color information of an image in accordance with an embodiment of the present invention.

FIG. 5 is a flowchart illustrating a method of performing motion compensation according to a color component of the input image, according to an embodiment of the present invention. Referring to FIGS. 4 and 5, the filter tap selector 400 selects a filter tap based on a color component received from the image information detector (not shown), in operation S500. If it is determined in operation S510 that the color component of the input image is an R-G-B component, the filter tap selector 400 selects the same interpolation method for the respective component of the R-G-B image in operation S520. For example, the filter tap selector 400 allows all the respective components of the R-G-B image to be passed through the long tap filter interpolator 410 or allows all the respective components of the R-G-B image to be passed through the short tap filter interpolator 420.

If it is determined that the color component of the input image is not an R-G-B component and is a Y-Cb-Cr component, the image information detector (not shown) determines whether the color component of the input image is a Y component (Luma) in operation S530. If the color component of the input image is the Luma component, the filter tap selector 400 selects the long tap filter interpolator 410 so that the input image may be interpolated by the long tap filter interpolator 410 in operation S540. If the color component of the input image is a chroma component (Cb, Cr), the filter tab selector 400 selects the short tap filter interpolator 420 in operation S550.

The reason of selecting a different tap filter interpolator according to the color component of the input image is that the long tap filter interpolation method using a plurality of adjacent pixels may correctly restore the high-frequency components, in comparison with the short tap filter interpolation method, when a plurality of high-frequency components exist in the color component of the input image. On the contrary, the short tap filter interpolator using the relatively small number of adjacent pixels is more effective in terms of complexity in comparison with maintaining a similar performance with the long tap filter interpolator if there are more low-frequency components than high-frequency components in the color component of the input image.

Figure 6:
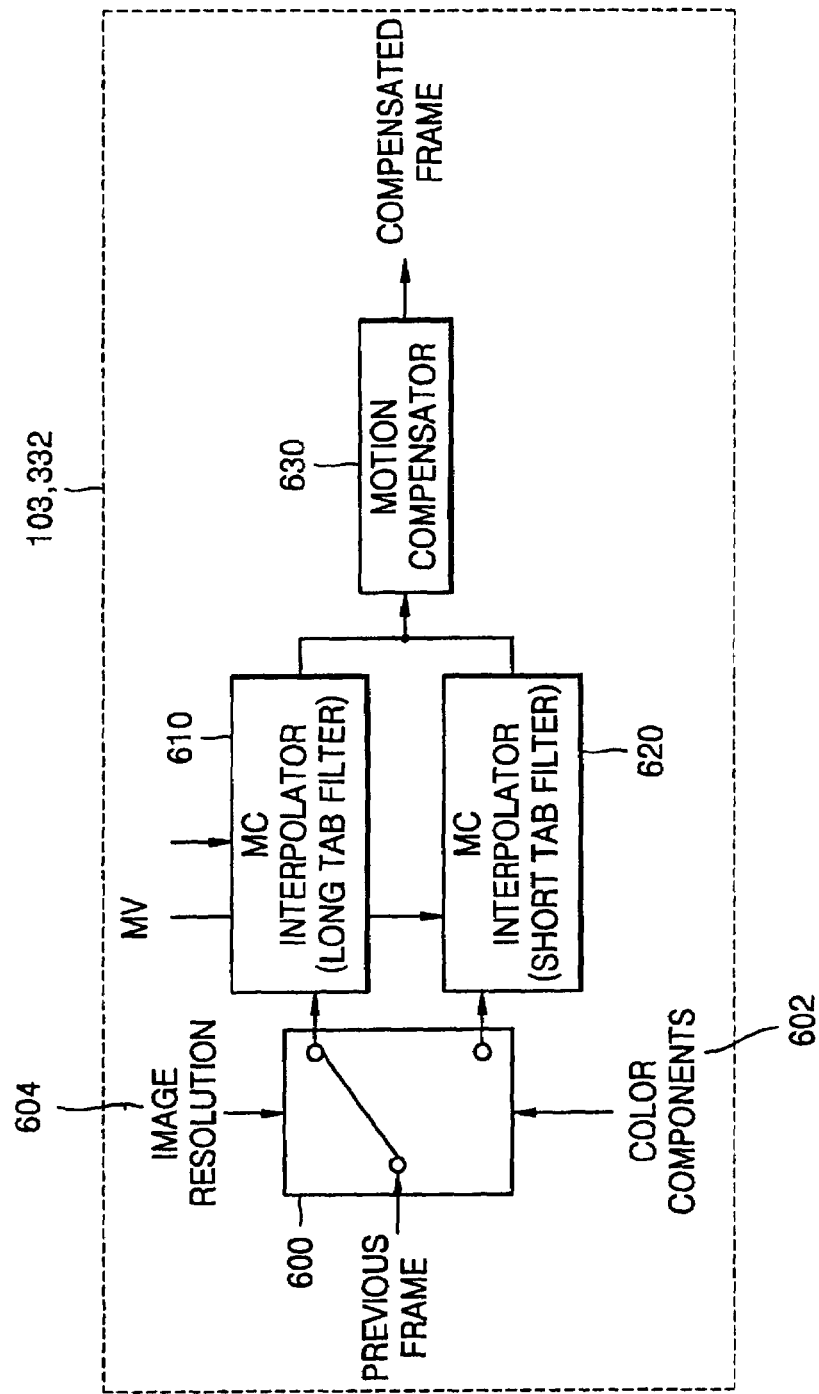
FIG. 6 is a block diagram of a motion compensation apparatus that compensates for motion on a basis of color information and resolution information of an image according to another embodiment of the present invention.

FIG. 6 is a block diagram showing a structure of a motion compensation apparatus, according to another embodiment of the present invention. Referring to FIG. 6, the motion compensation apparatus 103 or 332 includes an image information detector (not shown), a filter tap selector 600, interpolators 610 and 620, and a motion compensator 630.

Size or resolution information 604 of an image, as well as the color component 602 of the image influences the frequency characteristic. FIG. 6 is a block diagram of a motion compensation apparatus which uses a different motion compensation method according to color information and resolution information of an image in accordance with another embodiment of the present invention.

An image information detector (not shown) perceives color components and resolution information of an input image. In detail, the image information detector (not shown) determines whether the input image is a high-resolution image or a low-resolution image and whether the color component of the input image is the reference color component of the R-G-B image.

The filter tap selector 600 selects the length of a filter tap according to the color information and the resolution information of the input image perceived by the image information detector (not shown). In detail, the filter tap selector 600 selects a short tap filter if the input image is a high-resolution image or if the color component of the input image is a different color component from a Y component (Luma) of a Y-Cb-Cr image. Also, the filter tap selector 600 selects a long tap filter if the input image is a low-resolution image, if the input image is an R-G-B image, or if the color component of the input image is the Y component (Luma) of the Y-Cb-Cr image. Generally, the long tap filter is a 6 tap filter, and the short tap filter is a 2 tap filter.

There are an interpolator 610 (also, referred to as a long tap filter interpolator) using a long filter tap and an interpolator 620 (also, referred to as a short tap filter interpolator) using a short filter tap, and the interpolators 610 and 620 interpolate image information corresponding to a motion vector (MV) of a previous frame. The motion compensator 630 compensates for motion of the input image interpolated by the interpolators.

Figure 7:
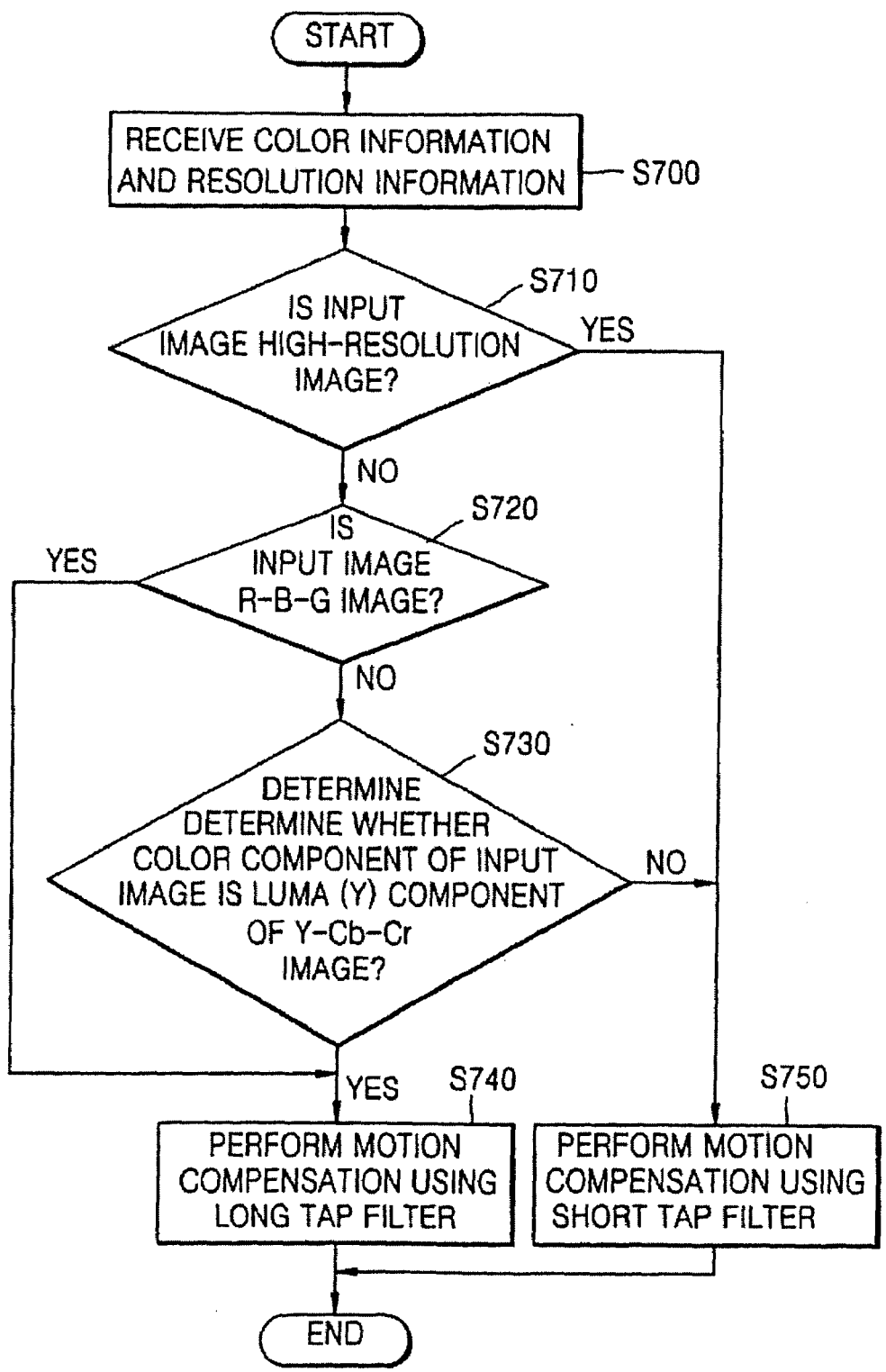
FIG. 7 is a flowchart illustrating a method of compensating motion on a basis of color information and resolution information of an image according to another embodiment of the present invention.

FIG. 7 is a flowchart illustrating a motion compensation method according to another embodiment of the present invention. In detail, FIG. 7 is a flowchart illustrating a method of performing motion compensation using color components and resolution information. Referring to FIGS. 6 and 7, the image information detector (not shown) receives image size information of an input image in operation S700 and determines whether the input image is a high-resolution image in operation S710. In the present invention, the high-resolution image refers to an image with a size greater than an image size of 1280×720 as the HD resolution level. A reference image size of 1280×720 may be changed according to environments and applications.

If the input image is a high-resolution image, the filter tap selector 600 selects the short tap filter interpolator in operation S750 because it is unnecessary to use a long tap filter, since more low frequency components than high frequency components are included in the high-resolution image. In the case of the high-resolution image, since a small portion of an actual image is displayed by a great number of pixels, differences between pixel values are small. In this case, since a video quality difference between when the long tap filter is used and when the short tap filter is used is small, the filter tap selector 600 selects the short tap filter interpolator 620 since the short tap filter has less complexity.

If the input image is a low-resolution image, the image information detector (not shown) receives color information in operation S700 and determines whether the input image is an R-G-B image in operation S720. If the color component of the input image is a R, G, or B component in operation S730, the filter tap selector 600 selects the long tap filter interpolator 610 so that all the respective components of the input image may be interpolated by the long tap filter interpolator 610. If the color component of the input image is not the R, G, or B component and is a Y, Cb, or Cr component, the image information detector (not shown) determines whether the color component of the input image is a Y component (Luma) in operation S730. If the color component of the input image is the Luma component, the filter tap selector 600 selects the long tap filter interpolator 610 in operation 740. If the color component of the input image is a chroma component, the filter tap selector 600 selects the short tap filter interpolator in operation S750.

Figure 8:
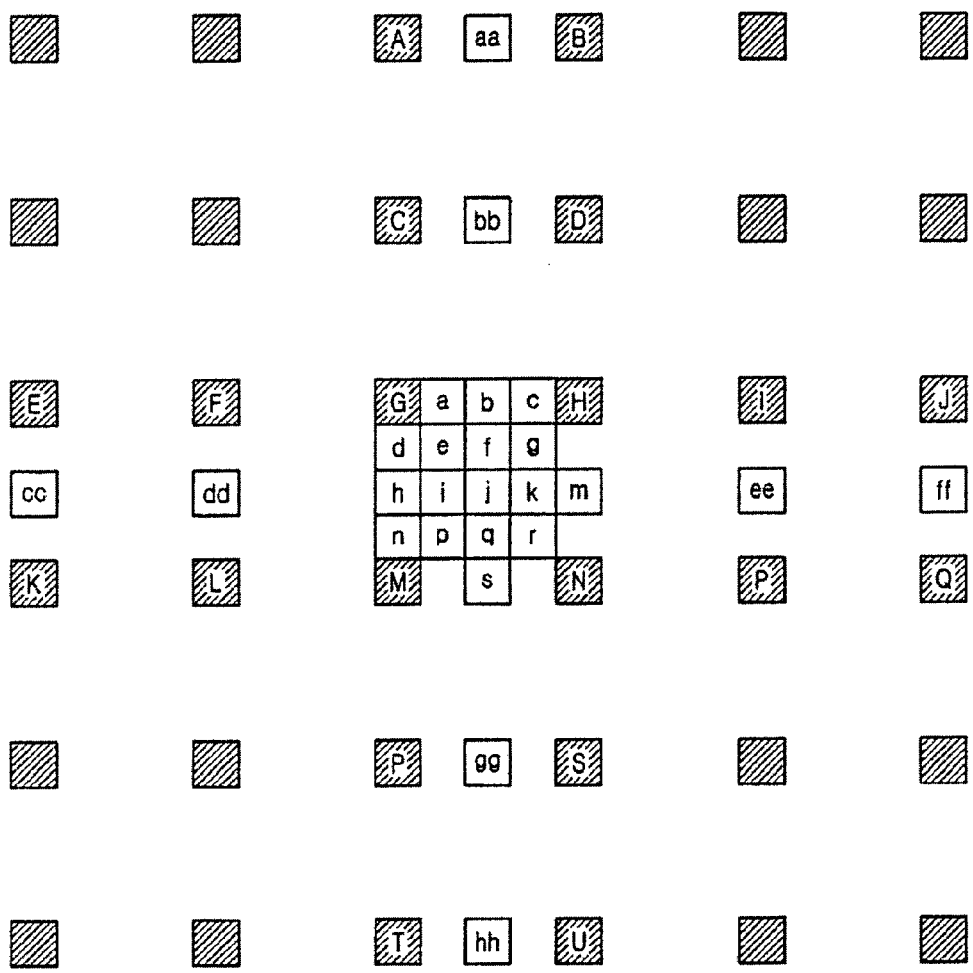
FIG. 8 is a view illustrating an interpolation method using a long tab filter.

FIG. 8 shows an example in which the 6 tap filter is used when an image of a previous frame is interpolated four times in a vertical or a horizontal direction for motion compensation. The 6 tap filter is defined by the MPEG-4 AVC/H.264. Referring to FIG. 8, when pixels A through U of a previous frame are given, pixels a through s, which are located in a ¼ or ½ pixel position, may be obtained according to the equations set forth below.

First, the pixels b and h to be located in the ½ pixel position, which is located in a vertical or horizontal direction from corresponding pixels, are interpolated using 6 adjacent pixels as follows.

$$b1=(E-5xf+20xg+20xh-5xI+J) \quad (10)$$

$$h1=(A-5xC+20xG+20xM-5xR+T) \quad (11)$$

$$b=\text{Clip1}((b1+16)>>5) \quad (12)$$

$$h=\text{Clip1}((h1+16)>>5) \quad (13)$$

Here, Clip1(x) means to clip a value x to a predetermined size so that the value x is within a bit range of the image pixels. In the case in which an input image is a 8-bit image, the value x of Clip1(x) is set to 0 if x is smaller than 0. If x is greater than 255, x is set to 255, and the remaining values are maintained as they are. A filter tap used for interpolation is a 6 tap filter (1, −5, 20, 20, −5, 1) which uses a relatively large number of adjacent pixels.

A pixel j to be located in a ½ pixel position is interpolated in a vertical and horizontal direction, using the previously-restored adjacent pixels corresponding to the ½ pixel position, according to equations 14a, 14b and 15.

$$j1=cc-5xdd+20xh1+20xm1-5xee+ff \quad (14a)$$

$$j1=aa-5xbb+20xb1+20xs1-5xgg+hh \quad (14b)$$

$$j=\text{Clip1}((j1+512)>>10) \quad (15)$$

Here, cc, dd, h1, m1, ee, ff, or aa, bb, b, s1, gg, and hh, as adjacent pixel values, are intermediate results obtained by performing interpolation by the 6 tap filter as in the above equations 10 and 11.

The pixel values s and m as final values, which are located in the ½ pixel position, are values restored from the pixel values s1 and m1 according to the equations 12 and 13.

The pixel values a, c, d, n, f, i, k and q, which are located in the ¼ pixel position, are values obtained by averaging two pixels adjacent in a vertical or horizontal direction, as in the following equations 16 through 23.

$$a=(G+b+1)>>1 \quad (16)$$

$$c=(H+b+1)>>1 \quad (17)$$

$$d=(G+h+1)>>1 \quad (18)$$

$$n=(M+h+1)>>1 \quad (19)$$

$$f=(b+j+1)>>1 \quad (20)$$

$$i=(h+j+1)>>1 \quad (21)$$

$$k=(j+m+1)>>1 \quad (22)$$

$$q=(j+s+1)>>1 \quad (23)$$

The pixel values e, g, p, and r, which are located in the ¼ pixel position, are values obtained by averaging two pixels adjacent in a diagonal direction, as in equations 24 through 27.

$$e=(b+h+1)>>1 \quad (24)$$

$$g=(b+m+1)>>1 \quad (25)$$

$$p=(h+s+1)>>1 \quad (26)$$

$$r=(m+s+1)>>1 \quad (27)$$

Figure 9:
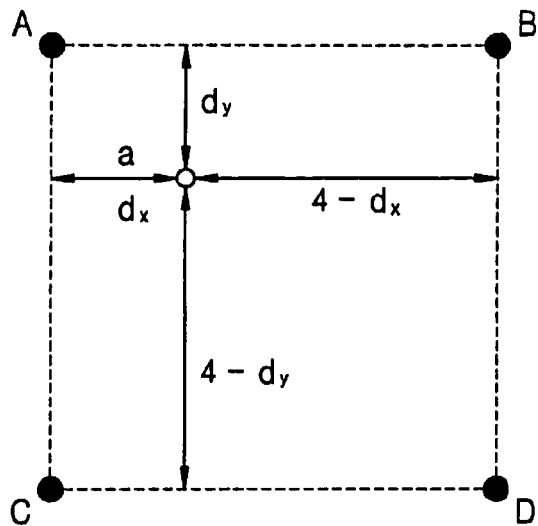
FIG. 9 is a view illustrating an interpolation method using a short tab filter.

FIG. 9 shows an example using a bilinear interpolation method (using a short tap filter) when an image of a previous frame is interpolated four times in a vertical or horizontal direction, to compensate for motion. This bilinear interpolation method is defined by the MPEG-4 AVC/H.264.

In the pixels A, B, C, and D of the previous frame, a pixel value which is located in a ¼ or ½ pixel position may be obtained by equation 28a.

$$a=((4-dx)\times(4-dy)\times A+dx\times(4-dy)\times B+(4-dx)\times dy\times C+dx\times dy\times D+8)>>4 \quad (28a)$$

Here, dx is a value representing, with a ¼ pixel position, a distance by which the pixel a is separated in a horizontal direction from the pixel A or C, and dy is a value representing, with a ¼ pixel position, a distance by which the pixel a is separated in a vertical direction from the pixel A or B.

Referring to FIG. 9, the bilinear interpolation method uses a relatively small number of adjacent pixels and uses pixel values located near a value to be interpolated, and differs from the method shown in FIG. 7.

Figure 10:
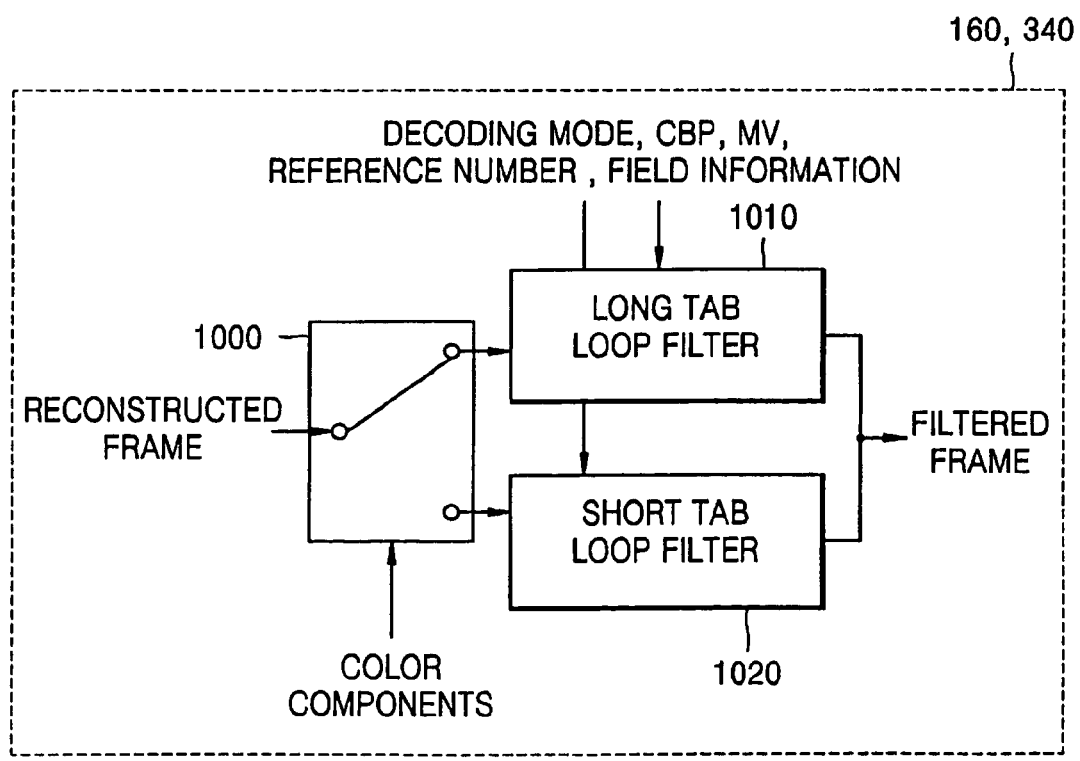
FIG. 10 is a view showing a deblocking filter unit.

FIG. 10 is a block diagram showing a structure of a deblocking filter unit which uses the characteristics of color components of an image, according to an embodiment of the present invention. The characteristics of the color components of an image are used by the deblocking filter unit for reducing a block effect generated after image restoration, as well as being used for motion compensation. FIG. 10 shows an embodiment of a deblocking filter which utilizes the color component characteristics of an image.

Referring to FIG. 10, a deblocking filter unit 160 or 340 includes an image information detector (not shown), a deblocking filter selector 1000, a long tap loop (deblocking) filter 1010, and a short tap loop (deblocking) filter 1020. The image information detector (not shown) determines whether an input image is a Y-Cb-Cr image or an R-G-B image and whether a color component of the input image is a luma (Y) component.

The deblocking filter selector 1000 selects one of the long tap loop filter and short tap loop filter 1010 and 1020 each with a different filter tap length, on a basis of the color component of the input image. For example, the deblocking filter selector 1000 selects the long tap loop filter 1010 if the input image is the R-G-B image or if the color component of the input image is the luma (Y) component of the Y-Gb-Gr image. Also, the deblocking filter selector 1000 selects the short tap loop filter 1020 if the color component of the input image is a chroma (Cb or Cr) component of the Y-Cb-Cr image.

The long tap loop filter 1010 has a different filter tap length from that of the short tap loop filter 1020. One of the long tap loop filter 1010 and the short tap loop filter 1020 is selected by the deblocking filter selector 1000.

Each of the long tap loop filter and short tap loop filter 1010 and 1020 determines whether filtering should be performed, on a basis of a block encoding mode, a CBP (Coded Block Pattern), reference image numbers for motion information (MV, MC) of a previous frame, and field information in a case of an interlaced image, and finally removes a block effect of the input image.

Figure 11:
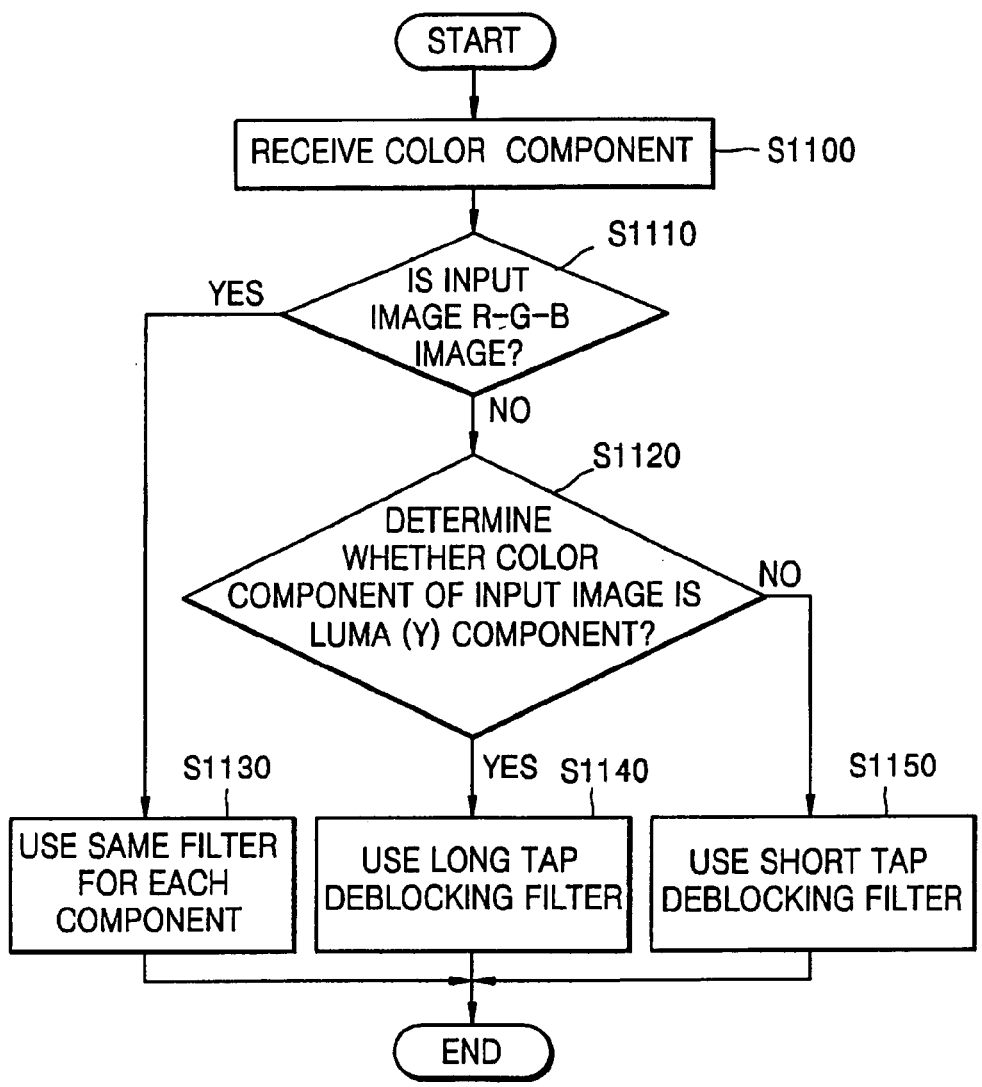
FIG. 11 is a flowchart illustrating a method of selecting the deblocking filters according to color information of an image in accordance with an embodiment of the present invention.

FIG. 11 is a flowchart illustrating a method of selecting a deblocking filter tap according to a color component of an input image in accordance with an embodiment of the present invention. Referring to FIGS. 10 and 11, the deblocking filter selector 1000 receives color information from the image information detector (not shown), and determines whether a color component of the input image is a color component of an R-G-B image in operation S1110. If the color component of the input image is the color component of the R-G-B image, the deblocking filter selector 1000 allocates the same filter tap coefficient to each of the color components in operation 1130. In this case, the deblocking filter selector 1000 generally selects the long tap loop filter 1010. If the color component of the input image is a color component of the Y-Cb-Cr image, the filter tap selector 1000 selects the long tap filter 1010 in operation S1140. If the color component of the input image is a chroma component, the filter tap selector 1000 selects the short tap loop filter 1020 in operation S1150.

Figures 12A, 12B, 13A, 13B:
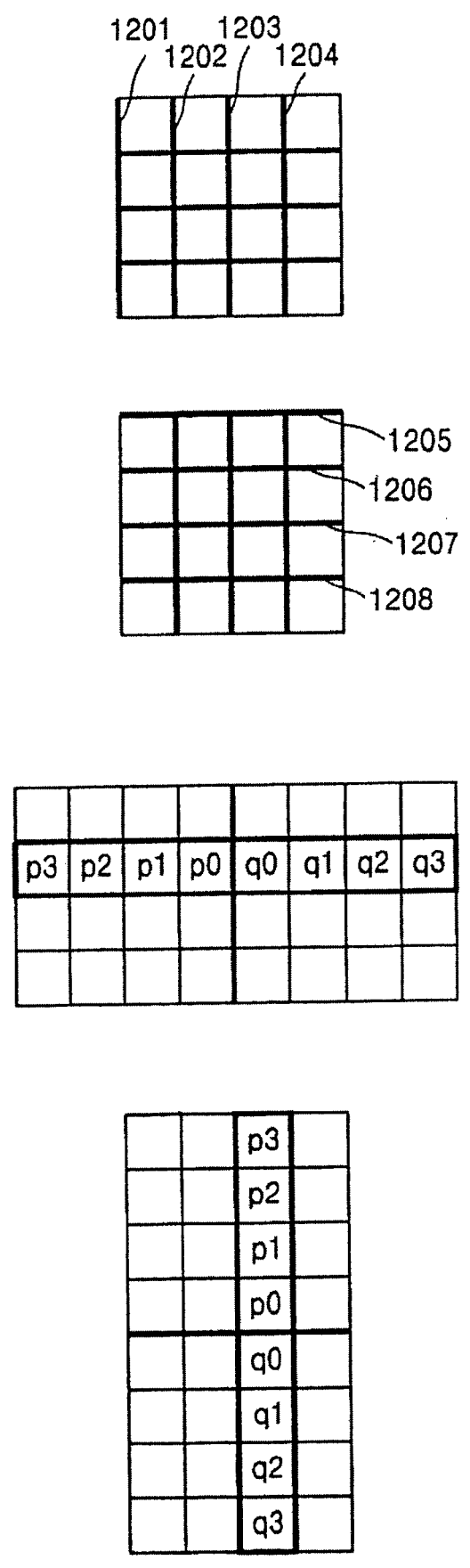

FIGS. 12A and 12B show vertical and horizontal directional boundaries to which deblocking filtering is performed to reduce a block effect in a 16×16 macro block. Referring to FIG. 12A, a macro block is divided into sixteen 4×4 blocks, each of which is encoded. Therefore, the block effect is generated at the boundaries of the 4×4 blocks. As shown in FIG. 12A, first, deblocking filtering is performed to vertical boundaries 1201, 1202, 1203, and 1204. Then, as seen in FIG. 12B, deblocking filtering is performed to horizontal boundaries 1205, 1206, 1207, and 1208.

FIGS. 13A and 13B show coefficients used when the deblocking filtering is performed to the vertical and horizontal boundaries of the 4×4 block. In the vertical boundaries, as shown in FIG. 13A, to reduce a block effect using pixel values of pixels p0, p1, p2, p3, q0, q1, q2, and q3 and a filter tap, the pixel values of the pixels p0, p1, p2, q0, q1, q2 are changed. FIG. 13B shows pixels to whose horizontal boundaries deblocking filtering is performed.

Since a loss level is different for each 4×4 block, it is necessary to change filter coefficients and determine whether filtering should be performed for each 4×4 block. For that, as shown in FIG. 10, whether deblocking filtering should be performed, that is, the length of filter tap, and the like, are decided using a predetermined threshold value, on a basis of a block encoding mode, a CBP (Coded Block Pattern), reference image numbers for motion information (MV, MC) of a previous frame, and field information in a case of an interlaced image. As a basic filter method, a filtering method defined by the MPEG-4 AVC/H.264 is used. A value filterFlag for deciding whether filtering should be performed using a 4×4 block may be calculated by equation 28b.

$$\text{filterFlag} = (Bs! = 0\&\&Abs(p0-q0) < \alpha\&\&Abs(p1-p0) < \beta Abs(q1-q0) < \beta) \tag{28b}$$

Here, deblocking filtering is performed only when the value filterFlag is 1. $\alpha$ and $\beta$ are threshold values for deciding whether the deblocking filtering should be performed according to a change of adjacent pixel values. The threshold values $\alpha$ and $\beta$ become greater as a quantization value increase. Bs (filter strength) is a value indicating a range of pixel values to be changed through the filter when the deblocking filtering is performed. The value Bs has a value between 0 through 4. If the value Bs is 0, filtering is not performed. As the value Bs approaches 4, the value of filter coefficients becomes greater. The value Bs is changed so that a majority of pixels among the pixels p0, p1, p2, p3, q0, q1, q2, q3 reduce a block effect.

First, long tap filter coefficients used when the color component is a R, G, and B component or a Y component of a Y-Cb-Cr image, may be defined by equations 29 through 45.

If the value Bs is smaller than 4, the pixels p0 and q0 most adjacent to the boundary are changed to p'0 and q'0 as follows.

$$\Delta = \text{Clip3}(-tc, tc, ((((q0-p0) << 2) + (p1-q1) + 4) >> 3)) \tag{29}$$

$$p'0 = \text{Clip1}(p0 + \Delta) \tag{30}$$

$$q'0 = \text{Clip1}(q0 - \Delta) \tag{31}$$

Here, Clip3(min, max, x) is defined to locate a value x between a minimum value min and a maximum value max. Clip1(x) has the same meaning as Clip1(x) of equation 12. tc is a threshold value for limiting a pixel value. Here, if the value Bs is large, tc also has a large value, which makes a changing level of a pixel value larger.

In the case of p1 and q1, the following values are defined to decide whether filtering should be performed.

$$ap = abs(2p - p0) \tag{32}$$

$$aq = abs(q2 - q0) \tag{33}$$

Here, if ap is smaller than $\beta$, p1 is changed to p'1. Otherwise, p1 is not changed.

$$p'(1) = p1 + \text{Clip3}(-tc, tc, (p2 + ((p0+p0+1) >> 1) - (p1 << 1) >> 1) \tag{34}$$

Here, q1 is changed to q'1 if aq is smaller than $\beta$, as follows. Otherwise, q1 is not changed.

$$q'1 = q1 + \text{Clip3}(-tc, tc, (q2 + ((q0+q0+1) >> 1) - (q1 >> 1)) \tag{35}$$

If Bs is 4, values Tp and Tq for deciding filter coefficients are defined as follows.

$$Tp = ap < \beta \&\& Abs(p0-q0) < ((\alpha >> 2) + 2) \tag{36}$$

$$Tq = aq < \beta \&\& Abs(p0-q0) < ((\alpha >> 2) + 2) \tag{37}$$

If Tp is 1, p0, p1, and p2 are changed respectively to p'0, p'1, and p'2 by increasing the value of filter coefficients, as follows.

$$p'0 = (p2 + 2xp1 + 2xp0 + 2xq0 + q1 + 4) >> 3 \tag{38}$$

$$p'1 = (p2 + p1 + p0 + q0 + 2) >> 2 \tag{39}$$

$$p'2 = (2xp3 + 3xp2 + p1 + p0 + q + 4) >> 3 \tag{40}$$

Meanwhile, if Tp is 0, only p0 is changed to p'0 by decreasing the value of the filter coefficients.

$$p'0 = (2xp1 + p0 + q1 + 2) >> 2 \tag{41}$$

Meanwhile, if Tq is 1, q0, q1, and q2 are changed respectively to q'0, q'1, and q'2 by increasing the value of the filter coefficients as follows.

$$q'0 = (p1 + 2xp0 + 2xq0 + 2xq1 + q2 + 4) >> 3 \tag{42}$$

$$q'1 = (p0 + q0 + q1 + q2 + 2) >> 2 \tag{43}$$

$$q'2 = (2xq3 + 3xq2 + q1 + q0 + p0 + 4) >> 3 \tag{44}$$

Meanwhile, if Tq is 0, only q0 is changed to q'0 by decreasing the value of filter coefficients as follows.

$$q'0=(2\times q1+q0+p1+2)>>2 \quad (45)$$

If the color component of the Y-Cb-Cr image is a Cb or Cr component, the short tap filter coefficients are determined as follows. First, if Bs is smaller than 4, p0 and q0 are changed to p'0 and q'0, respectively, according to equations 30 and 31. Differently from the R-G-B image and the Y component, the values of p1 and q1 are not changed. If Bs is 4, only the values of p0 and q0 are changed to p'0 and q'0, respectively, according to equations 41 and 45. Differently from the R-G-B image and the Y component, the values of p1 and q1 are not changed.

Figure 14A:
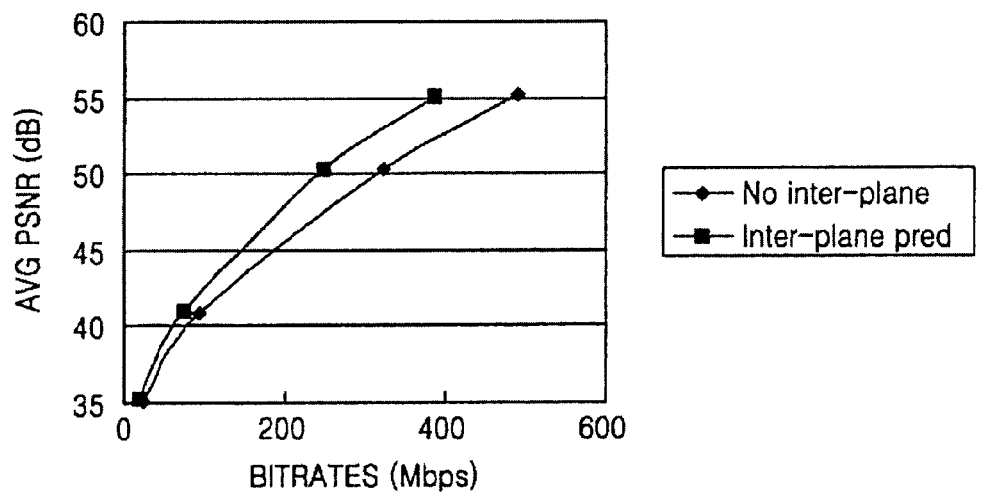
FIGS. 14A and 14B are graphs showing a simulation result of an inter-plane prediction coding method according to an embodiment of the present invention and according to the conventional technique at a same bit rate, respectively.
Figure 14B:
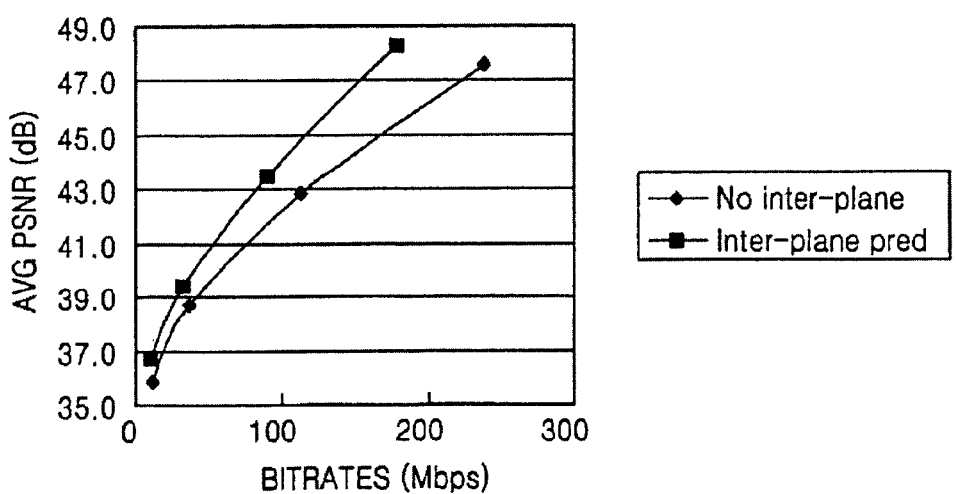

FIG. 14A is a graph showing a simulation result of video encoding using an inter-plane prediction coding method according to an embodiment of the present invention when an R-G-B image is provided as an input image. FIGS. 14A and 14B show a comparison result of when the inter-plane prediction according to an embodiment of the present invention is used and when the inter-plane prediction is not used, respectively. Here, an input image is a CREW image with a 1280×720 size, and the simulation result is represented with PSNR at four bit rates.

FIG. 14A shows a simulation result in an intra mode that performs only spatial prediction, and FIG. 14B shows a simulation result when temporal prediction and spatial prediction are used. As shown in FIGS. 14A and 14B, there is more than 3 dB gain difference between the present invention and the conventional technique at a same bit rate.

Figure 15A:
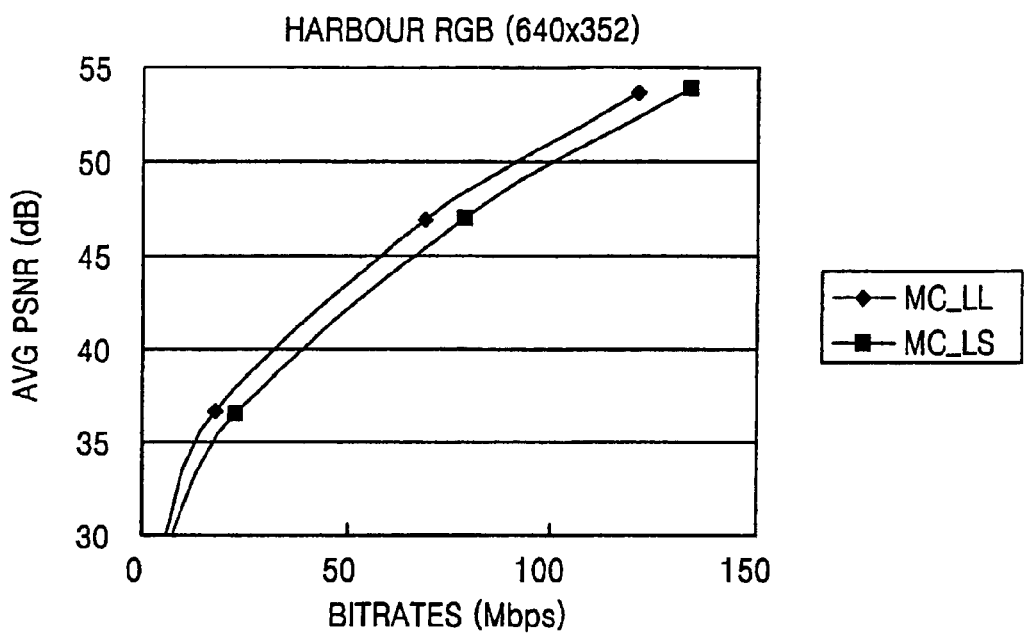
FIGS. 15A and 15B are graphs showing a simulation result when coding is performed using a motion compensation apparatus according to an embodiment the present invention and according to the conventional technique at a same bit rate, respectivley.

FIG. 15A shows a comparison result for a 640×350 Harbour image, between a case (MC_LL) where a 6 tap filter is used for motion compensation and a case (MC_LC) where the 6 tap filter is used for G components and the bilinear filter is used for R and B components, when an R-G-B image is used as an input image It is seen in FIG. 15A that in the MC_LL method, according to an embodiment of the present invention, a PSNR gain is higher than that of the conventional technique at a same bit rate.

Figure 15B:
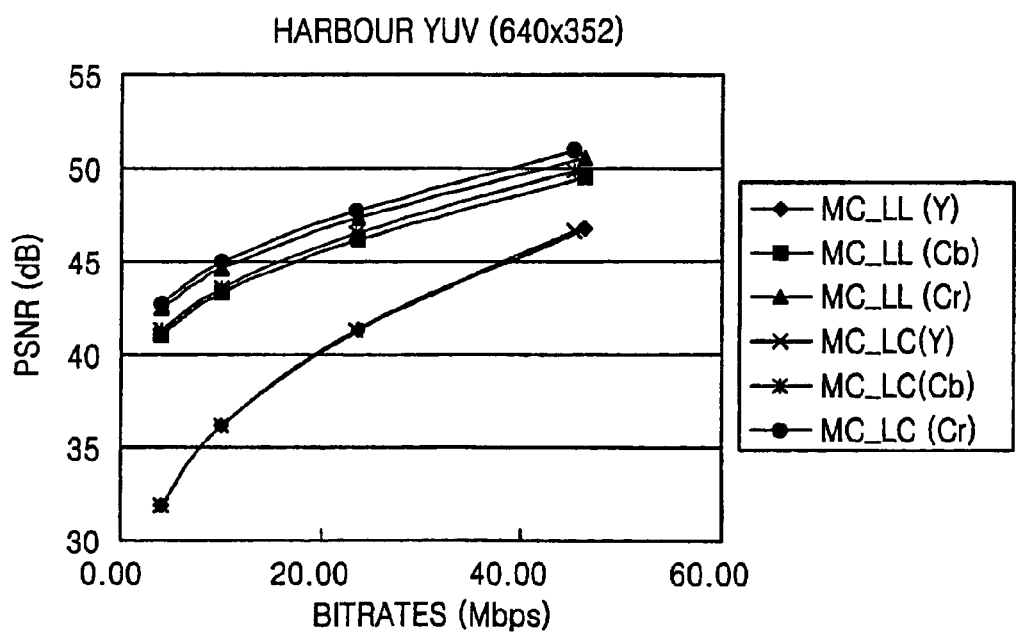

FIG. 15B shows a comparison result for a 640×352 Harbour image, between a case (MC_LC) where the 6 tap filter is used for Y components and the Bilinear filter is used for Cb and Cr components and a case (MC_LL) where the 6 tap filter is used for all of Y, Cb and Cr components for motion compensation, when a Y-Cb-Cr image is used as an input image. It is seen in FIG. 15B that in the present invention, PSNR is improved at a same bit rate for each Y, Cb, and Cr component.

The present invention may be embodied as a program stored on a computer readable medium that can be run on a general computer. Here, the computer readable medium includes, but is not limited to, storage media such as magnetic storage media (e.g., ROM's, floppy disks, hard disks, and the like), optically readable media (e.g., CD-ROMs, DVDs, etc.), and carrier waves (e.g., transmission over the Internet). The present invention may also be embodied as a computer readable program code unit stored on a computer readable medium, for causing a number of computer systems connected via a network to affect distributed processing.

As described above, the present invention may efficiently encode and decode video data considering color component characteristics of an input image. In particular, it is possible to improve encoding efficiency of an R-G-B image through inter-plane prediction. The present invention may be applied to Digital Archive, digital cinema, and the like, requiring image information with high-quality since R-G-B images are directly encoded.

Also, the present invention utilizes all of color component characteristics and image resolution characteristics for motion compensation and deblocking filtering in an encoder and decoder. The present invention may improve encoding efficiency by enhancing image quality through filtering according to characteristics of images. Therefore, the present invention may construct a suitable encoder and decoder in correspondence with respective characteristics of R-G-B images and Y-Cb-Cr images.

Although a few embodiments of the present invention have been shown and described, it would be appreciated by those skilled in the art that changes may be made in these embodiments without departing from the principles and spirit of the invention, the scope of which is defined in the claims and their equivalents.

What is claimed is:

1. A video decoding apparatus comprising:
a first restoration unit performing a predetermined operation of an encoded image and generating a first prediction residue image of the encoded image;
an image information detection unit determining whether the encoded image is an R-G-B image or a Y-Cb-Cr image and whether a color component of the encoded image is a reference color component of the R-G-B image;
a second restoration unit generating a second prediction residue image of the encoded image, on a basis of the reference color component if the encoded image is the R-G-B image and the color component of the encoded image is not the reference color component; and
a deblocking filter unit reducing a block effect of a decoded image of an encoded image restored on a basis of the first prediction residue image and the second prediction residue image.

2. The video decoding apparatus of claim 1, wherein the first restoration unit performs entropy decoding, dequantization, and an inverse discrete integer transform of the encoded image, and generates the first prediction residue image.

3. The video decoding apparatus of claim 1, wherein the deblocking filter unit selects a filter tap with a predetermined length on a basis of color information of the decoded image and reduces a block effect of the decoded image using the selected filter tap.

4. A deblocking filter apparatus, which is included in a video decoder or video encoder, comprising:
an image information detector detecting color information of an image;
a deblocking filter selector selecting a length of a deblocking filter tap to reduce a block effect of the image on a basis of the color information; and
a filtering unit filtering the image using a deblocking filter with the selected tap length,
wherein the image information detector determines whether the image is a Y-Cb-Cr image or an R-G-B image and whether a color component of the image is a Y component of the Y-Cb-Cr image, and
wherein the deblocking filter selector selects a Luma-based deblocking filter if the image is the R-G-B image or if the color component of the image is the Y component, and selects a Chroma-based deblocking filter if the color component of the image is a Cb or Cr component.

5. The deblocking filter apparatus of claim 4, wherein the deblocking filter selector selects a 6 tap deblocking filter if the image is the R-G-B image or if the color component of the image is the Y component, and selects a 2 tap deblocking filter if the color component of the image is a Cb or Cr component.

6. The deblocking filter apparatus of claim 4, wherein the filtering unit determines whether filtering for the image should be performed, on a basis of a block encoding mode, a coded block pattern, a motion vector of a previous frame, a reference image number of motion compensation, and field information in a case of an interlaced image.

7. A deblocking filter selection method, which is performed by a decoder or encoder, comprising:
   detecting color information of an image;
   selecting a length of a deblocking filer to reduce a block effect of the image on a basis of the color information; and
   filtering the image using a deblocking filter with the selected length, wherein the detecting the image information comprises:
   determining by the decoder or encoder whether the image is a Y-Cb-Cr image or an R-G-B image and whether a color component of the image is a Y component of the Y-Cb-Cr image, and wherein the selecting the deblocking filter comprises:
   selecting by the decoder or encoder a Luma-based deblocking filter if the image is the R-G-B image or if the color component of the image is the Y component, and selecting a Chroma-based deblocking filter if the color component of the image is a Cb or Cr component.

8. The deblocking filter selection method of claim 7, wherein the selecting the deblocking filter comprises:
   selecting a 6 tap deblocking filter if the image is the R-G-B image or if the color component of the image is the Y component, and selecting a 2 tap deblocking filter if the color component of the image is a Cb or Cr component.

9. The deblocking filter selection method of claim 7, wherein the filtering the image comprises:
   determines whether filtering for the image is to be performed on a basis of a block encoding mode, a coded block pattern, a motion vector of a previous frame, a reference image number of motion compensation, and field information in a case of an interlaced image.

* * * * *

UNITED STATES PATENT AND TRADEMARK OFFICE
CERTIFICATE OF CORRECTION

PATENT NO. : 7,535,961 B2
APPLICATION NO. : 10/892244
DATED : May 19, 2009
INVENTOR(S) : Dae-sung Cho et al.

It is certified that error appears in the above-identified patent and that said Letters Patent is hereby corrected as shown below:

Column 19, Line 10, change "filer" to --filter--.

Column 19, Line 16, change "encoder" to --encoder,--.

Column 20, Line 1, change "encoder" to --encoder,--.

Signed and Sealed this

Twenty-ninth Day of September, 2009

David J. Kappos
*Director of the United States Patent and Trademark Office*